(12) United States Patent
Techel et al.

(10) Patent No.: US 11,847,633 B1
(45) Date of Patent: *Dec. 19, 2023

(54) CONNECTED PAYMENT CARD SYSTEMS AND METHODS

(71) Applicant: Wells Fargo Bank, N.A., San Francisco, CA (US)

(72) Inventors: Michelle B. Techel, San Carlos, CA (US); Peter Ho, Walnut Creek, CA (US); Timothy R. Edge, San Francisco, CA (US); Dorothy M. Scocci, San Ramon, CA (US); Brenda L. Yost, San Francisco, CA (US); Kathy Barris Dideum, San Antonio, TX (US); Cheryl Lynn Wong, Alameda, CA (US); Khyati Soparkar, Fremont, CA (US); Steven E. Puffer, Champlin, MN (US); Stephanie S. Hellman, Fairfax, CA (US); Brian M. Pearce, Pleasanton, CA (US); James D. Crowell, West Des Moines, IA (US)

(73) Assignee: Wells Fargo Bank, N.A., Fort Lauderdale, FL (US)

(*) Notice: Subject to any disclaimer, the term of this patent is extended or adjusted under 35 U.S.C. 154(b) by 13 days.

This patent is subject to a terminal disclaimer.

(21) Appl. No.: 17/522,884

(22) Filed: Nov. 9, 2021

Related U.S. Application Data

(63) Continuation of application No. 15/360,275, filed on Nov. 23, 2016, now Pat. No. 11,200,562, which is a
(Continued)

(51) Int. Cl.
*G06Q 20/34* (2012.01)
*G06F 3/0482* (2013.01)
*G06Q 20/36* (2012.01)

(52) U.S. Cl.
CPC .......... *G06Q 20/34* (2013.01); *G06F 3/0482* (2013.01); *G06Q 20/36* (2013.01)

(58) Field of Classification Search
CPC ....... G06Q 20/34; G06Q 20/36; G06F 3/0482
See application file for complete search history.

(56) References Cited

U.S. PATENT DOCUMENTS

| 5,485,510 A | 1/1996 | Colbert |
| 5,573,457 A | 11/1996 | Watts et al. |

(Continued)

FOREIGN PATENT DOCUMENTS

| CN | 102498497 A | 6/2012 |
| CN | 102804219 A | 11/2012 |

(Continued)

OTHER PUBLICATIONS

US 10,979,433 B2, 04/2021, Zhang (withdrawn)
(Continued)

*Primary Examiner* — Neha Patel
*Assistant Examiner* — Chunling Ding
(74) *Attorney, Agent, or Firm* — Foley & Lardner LLP

(57) ABSTRACT

Methods and systems of managing payment cards are disclosed. A financial institution computing system includes a token database storing a plurality of tokens and token information, a network interface circuit enabling the financial institution computing system to exchange information over a network; and a token management circuit. The token management circuit enables a graphical user interface on a customer device over the network that can be used to generate new token requests, re-provision token requests, and management requests. The management requests enable and disable tokens, such that transactions against a payment
(Continued)

card account using an enabled token are completed, and transactions against the payment card account using a disabled token are denied.

20 Claims, 7 Drawing Sheets

Related U.S. Application Data continuation of application No. 15/054,633, filed on Feb. 26, 2016, now Pat. No. 11,170,364.

(60) Provisional application No. 62/199,783, filed on Jul. 31, 2015.

(56)     References Cited

U.S. PATENT DOCUMENTS

| | | |
|---|---|---|
| 5,737,423 A | 4/1998 | Manduley |
| 5,999,978 A | 12/1999 | Angal et al. |
| 6,047,268 A | 4/2000 | Bartoli et al. |
| 6,105,006 A | 8/2000 | Davis et al. |
| 6,188,309 B1 | 2/2001 | Levine |
| 6,193,152 B1 | 2/2001 | Fernando et al. |
| 6,408,330 B1 | 6/2002 | Delahuerga |
| 6,422,462 B1 | 7/2002 | Cohen |
| 6,494,367 B1 | 12/2002 | Zacharias |
| 6,575,361 B1 | 6/2003 | Graves et al. |
| 6,717,592 B2 | 4/2004 | Gusler et al. |
| 6,845,906 B2 | 1/2005 | Royer et al. |
| 6,865,547 B1 | 3/2005 | Brake et al. |
| 6,879,965 B2 | 4/2005 | Fung et al. |
| 6,910,021 B2 | 6/2005 | Brown et al. |
| 6,931,382 B2 | 8/2005 | Laage et al. |
| 6,980,969 B1 | 12/2005 | Tuchler et al. |
| 7,014,107 B2 | 3/2006 | Singer et al. |
| 7,016,877 B1 | 3/2006 | Steele et al. |
| 7,107,243 B1 | 9/2006 | McDonald et al. |
| 7,155,411 B1 | 12/2006 | Blinn et al. |
| 7,219,833 B2 | 5/2007 | Cantini et al. |
| 7,225,156 B2 | 5/2007 | Fisher et al. |
| 7,249,099 B2 | 7/2007 | Ling |
| 7,264,154 B2 | 9/2007 | Harris |
| 7,319,986 B2 | 1/2008 | Praisner et al. |
| 7,331,518 B2 | 2/2008 | Rable |
| 7,347,361 B2 | 3/2008 | Lovett |
| 7,359,880 B2 | 4/2008 | Abel et al. |
| 7,383,988 B2 | 6/2008 | Slonecker, Jr. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,413,113 B1 | 8/2008 | Zhu |
| 7,451,395 B2 | 11/2008 | Brants et al. |
| 7,512,563 B2 | 3/2009 | Likourezos et al. |
| 7,552,088 B2 | 6/2009 | Malcolm |
| 7,571,142 B1 | 8/2009 | Flitcroft et al. |
| 7,587,365 B2 | 9/2009 | Malik et al. |
| 7,653,597 B1 | 1/2010 | Stevanovski et al. |
| 7,685,037 B2 | 3/2010 | Reiners et al. |
| 7,689,502 B2 | 3/2010 | Lilly et al. |
| 7,698,221 B2 | 4/2010 | Blinn et al. |
| 7,707,082 B1 | 4/2010 | Lapstun et al. |
| 7,712,655 B2 | 5/2010 | Wong |
| 7,740,170 B2 | 6/2010 | Singh et al. |
| 7,753,265 B2 | 7/2010 | Harris |
| 7,778,932 B2 | 8/2010 | Yan |
| 7,818,319 B2 | 10/2010 | Henkin et al. |
| 7,873,573 B2 | 1/2011 | Realini |
| 7,937,325 B2 | 5/2011 | Kumar et al. |
| 7,941,534 B2 | 5/2011 | De La Huerga |
| 7,949,572 B2 | 5/2011 | Perrochon et al. |
| 7,954,704 B1 | 6/2011 | Gephart et al. |
| 8,090,346 B2 | 1/2012 | Cai |
| 8,099,109 B2 | 1/2012 | Altman et al. |
| 8,127,982 B1 | 3/2012 | Casey et al. |
| 8,160,933 B2 | 4/2012 | Nguyen et al. |
| 8,175,938 B2 | 5/2012 | Olliphant et al. |
| 8,196,131 B1 | 6/2012 | Von Behren et al. |
| 8,245,909 B2 | 8/2012 | Pletz et al. |
| 8,249,983 B2 | 8/2012 | Dilip et al. |
| 8,255,323 B1 | 8/2012 | Casey et al. |
| 8,266,031 B2 | 9/2012 | Norris et al. |
| 8,266,205 B2 | 9/2012 | Hammad et al. |
| 8,280,786 B1 | 10/2012 | Weiss et al. |
| 8,280,788 B2 | 10/2012 | Perlman |
| 8,296,228 B1 | 10/2012 | Kloor |
| 8,297,502 B1 | 10/2012 | McGhie et al. |
| 8,301,566 B2 | 10/2012 | Mears |
| 8,332,294 B1 | 12/2012 | Thearling |
| 8,359,531 B2 | 1/2013 | Grandison et al. |
| 8,360,952 B2 | 1/2013 | Wissman et al. |
| 8,364,556 B2 | 1/2013 | Nguyen et al. |
| 8,396,808 B2 | 3/2013 | Greenspan |
| 8,407,136 B2 | 3/2013 | Bard et al. |
| 8,407,142 B1 | 3/2013 | Griggs |
| 8,423,349 B1 | 4/2013 | Huynh et al. |
| 8,473,394 B2 | 6/2013 | Marshall |
| 8,489,761 B2 | 7/2013 | Pope et al. |
| 8,489,894 B2 | 7/2013 | Comrie et al. |
| 8,543,506 B2 | 9/2013 | Grandcolas et al. |
| 8,589,335 B2 | 11/2013 | Smith et al. |
| 8,595,074 B2 | 11/2013 | Sharma et al. |
| 8,595,098 B2 | 11/2013 | Starai et al. |
| 8,625,838 B2 | 1/2014 | Song et al. |
| 8,630,952 B2 | 1/2014 | Menon |
| 8,635,687 B2 | 1/2014 | Binder |
| 8,639,629 B1 | 1/2014 | Hoffman |
| 8,655,310 B1 | 2/2014 | Katzer et al. |
| 8,655,719 B1 | 2/2014 | Li et al. |
| 8,660,926 B1 | 2/2014 | Wehunt et al. |
| 8,666,411 B2 | 3/2014 | Tokgoz et al. |
| 8,682,753 B2 | 3/2014 | Kulathungam |
| 8,682,802 B1 | 3/2014 | Kannanari |
| 8,700,729 B2 | 4/2014 | Dua |
| 8,706,625 B2 | 4/2014 | Vicente et al. |
| 8,712,839 B2 | 4/2014 | Steinert et al. |
| 8,725,601 B2 | 5/2014 | Ledbetter et al. |
| 8,762,211 B2 | 6/2014 | Killian et al. |
| 8,762,237 B2 | 6/2014 | Monasterio et al. |
| 8,768,838 B1 | 7/2014 | Hoffman |
| 8,781,957 B2 | 7/2014 | Jackson et al. |
| 8,781,963 B1 | 7/2014 | Feng et al. |
| 8,793,190 B2 | 7/2014 | Johns et al. |
| 8,794,972 B2 | 8/2014 | Lopucki |
| 8,851,369 B2 | 10/2014 | Bishop et al. |
| 8,868,458 B1 | 10/2014 | Starbuck et al. |
| 8,868,666 B1 | 10/2014 | Hellwege et al. |
| 8,880,047 B2 | 11/2014 | Konicek et al. |
| 8,887,997 B2 | 11/2014 | Barret et al. |
| 8,924,288 B1 | 12/2014 | Easley et al. |
| 8,925,099 B1 | 12/2014 | Saxe et al. |
| 8,954,839 B2 | 2/2015 | Sharma et al. |
| 9,076,134 B2 | 7/2015 | Grovit et al. |
| 9,105,021 B2 | 8/2015 | Tobin |
| 9,195,984 B1 | 11/2015 | Spector et al. |
| 9,256,871 B2 | 2/2016 | Anderson et al. |
| 9,256,904 B1 | 2/2016 | Haller et al. |
| 9,305,155 B1 | 4/2016 | Vo et al. |
| 9,372,849 B2 | 6/2016 | Gluck et al. |
| 9,390,417 B2 | 7/2016 | Song et al. |
| 9,396,491 B2 | 7/2016 | Isaacson et al. |
| 9,444,824 B1 | 9/2016 | Balazs et al. |
| 9,489,694 B2 | 11/2016 | Haller et al. |
| 9,514,456 B2 | 12/2016 | England et al. |
| 9,519,934 B2 | 12/2016 | Calman et al. |
| 9,558,478 B2 | 1/2017 | Zhao |
| 9,569,473 B1 | 2/2017 | Holenstein et al. |
| 9,569,766 B2 | 2/2017 | Kneen |
| 9,576,318 B2 | 2/2017 | Caldwell |
| 9,646,300 B1 | 5/2017 | Zhou et al. |
| 9,647,855 B2 | 5/2017 | Deibert et al. |
| 9,690,621 B2 | 6/2017 | Kim et al. |
| 9,699,610 B1 | 7/2017 | Chicoine et al. |
| 9,740,543 B1 | 8/2017 | Savage et al. |

(56) References Cited

U.S. PATENT DOCUMENTS

| | | |
|---|---|---|
| 9,792,636 B2 | 10/2017 | Milne |
| 9,792,648 B1 | 10/2017 | Haller et al. |
| 9,849,364 B2 | 12/2017 | Tran et al. |
| 9,853,959 B1 | 12/2017 | Kapczynski et al. |
| 9,858,405 B2 | 1/2018 | Ranadive et al. |
| 9,858,576 B2 | 1/2018 | Song et al. |
| 9,978,046 B2 | 5/2018 | Lefebvre et al. |
| 10,032,146 B2 | 7/2018 | Caldwell |
| 10,044,501 B1 | 8/2018 | Bradley et al. |
| 10,044,647 B1 | 8/2018 | Karp et al. |
| 10,050,779 B2 | 8/2018 | Alness et al. |
| 10,055,747 B1 | 8/2018 | Sherman et al. |
| 10,115,155 B1 | 10/2018 | Haller et al. |
| 10,152,756 B2 | 12/2018 | Isaacson et al. |
| 10,157,420 B2 | 12/2018 | Narayana et al. |
| 10,187,483 B2 | 1/2019 | Golub et al. |
| 10,204,327 B2 | 2/2019 | Katzin et al. |
| 10,216,548 B1 | 2/2019 | Zhang et al. |
| 10,250,453 B1 | 4/2019 | Singh et al. |
| 10,275,602 B2 | 4/2019 | Bjorn et al. |
| 10,359,915 B2 | 7/2019 | Asai |
| 10,402,817 B1 | 9/2019 | Benkreira et al. |
| 10,402,818 B2 | 9/2019 | Zarakas et al. |
| 10,417,396 B2 | 9/2019 | Bawa et al. |
| 10,423,948 B1 | 9/2019 | Wilson et al. |
| 10,445,152 B1 | 10/2019 | Zhang et al. |
| 10,460,395 B2 | 10/2019 | Grassadonia |
| 10,521,798 B2 | 12/2019 | Song et al. |
| 10,592,882 B1 * | 3/2020 | Viswanath ........... G06Q 20/202 |
| 10,650,448 B1 | 5/2020 | Haller et al. |
| 10,657,503 B1 | 5/2020 | Ebersole et al. |
| 10,867,298 B1 | 12/2020 | Duke et al. |
| 10,872,005 B1 | 12/2020 | Killis |
| 10,878,496 B1 | 12/2020 | Duong et al. |
| 10,963,589 B1 | 3/2021 | Fakhraie et al. |
| 10,984,482 B1 | 4/2021 | Thangarajah et al. |
| 10,992,679 B1 | 4/2021 | Fakhraie et al. |
| 11,107,561 B2 | 8/2021 | Matthieu et al. |
| 11,144,903 B2 | 10/2021 | Ready et al. |
| 11,151,529 B1 | 10/2021 | Nolte et al. |
| 2001/0001856 A1 | 5/2001 | Gould et al. |
| 2001/0032183 A1 | 10/2001 | Landry |
| 2001/0051920 A1 | 12/2001 | Joao et al. |
| 2001/0056398 A1 | 12/2001 | Scheirer |
| 2002/0016749 A1 | 2/2002 | Borecki et al. |
| 2002/0035539 A1 | 3/2002 | O'Connell |
| 2002/0038289 A1 | 3/2002 | Lawlor et al. |
| 2002/0062249 A1 | 5/2002 | Iannacci |
| 2002/0095386 A1 | 7/2002 | Maritzen et al. |
| 2002/0143655 A1 | 10/2002 | Elston et al. |
| 2002/0169720 A1 | 11/2002 | Wilson et al. |
| 2003/0046246 A1 | 3/2003 | Klumpp et al. |
| 2003/0055786 A1 | 3/2003 | Smith et al. |
| 2003/0061163 A1 | 3/2003 | Durfield |
| 2003/0097331 A1 | 5/2003 | Cohen |
| 2003/0172040 A1 | 9/2003 | Kemper et al. |
| 2003/0195847 A1 | 10/2003 | Felger |
| 2003/0200179 A1 | 10/2003 | Kwan |
| 2003/0216997 A1 | 11/2003 | Cohen |
| 2003/0217001 A1 | 11/2003 | McQuaide et al. |
| 2004/0054564 A1 | 3/2004 | Fonseca et al. |
| 2004/0054591 A1 | 3/2004 | Spaeth et al. |
| 2004/0073903 A1 * | 4/2004 | Melchione ................ G06F 8/60 717/172 |
| 2004/0078325 A1 | 4/2004 | O'Connor |
| 2004/0090825 A1 | 5/2004 | Nam et al. |
| 2004/0128243 A1 | 7/2004 | Kavanagh et al. |
| 2004/0143632 A1 | 7/2004 | McCarty |
| 2004/0148259 A1 | 7/2004 | Reiners et al. |
| 2004/0178907 A1 | 9/2004 | Cordoba |
| 2004/0225606 A1 | 11/2004 | Nguyen et al. |
| 2004/0249710 A1 | 12/2004 | Smith et al. |
| 2004/0249753 A1 | 12/2004 | Blinn et al. |
| 2004/0263901 A1 | 12/2004 | Critelli et al. |
| 2005/0010483 A1 | 1/2005 | Ling |
| 2005/0014705 A1 | 1/2005 | Cheng et al. |
| 2005/0039041 A1 | 2/2005 | Shaw et al. |
| 2005/0060233 A1 | 3/2005 | Bonalle et al. |
| 2005/0114705 A1 | 5/2005 | Reshef et al. |
| 2005/0131815 A1 | 6/2005 | Fung et al. |
| 2005/0171898 A1 | 8/2005 | Bishop et al. |
| 2005/0199714 A1 | 9/2005 | Brandt et al. |
| 2005/0205662 A1 | 9/2005 | Nelson |
| 2005/0224587 A1 | 10/2005 | Shin et al. |
| 2005/0228750 A1 | 10/2005 | Olliphant et al. |
| 2005/0273431 A1 | 12/2005 | Abel et al. |
| 2006/0046742 A1 | 3/2006 | Zhang |
| 2006/0046745 A1 | 3/2006 | Davidson |
| 2006/0059110 A1 | 3/2006 | Madhok et al. |
| 2006/0178986 A1 | 8/2006 | Giordano et al. |
| 2006/0184456 A1 | 8/2006 | De Janasz |
| 2006/0190374 A1 | 8/2006 | Sher |
| 2006/0202012 A1 | 9/2006 | Grano et al. |
| 2006/0206912 A1 | 9/2006 | Klarfeld et al. |
| 2006/0235795 A1 | 10/2006 | Johnson et al. |
| 2006/0278698 A1 | 12/2006 | Lovett |
| 2007/0051797 A1 * | 3/2007 | Randolph-Wall ...... G06Q 20/10 705/14.27 |
| 2007/0083463 A1 | 4/2007 | Kraft |
| 2007/0100773 A1 | 5/2007 | Wallach |
| 2007/0112673 A1 | 5/2007 | Protti |
| 2007/0123305 A1 | 5/2007 | Chen et al. |
| 2007/0143831 A1 | 6/2007 | Pearson et al. |
| 2007/0203836 A1 | 8/2007 | Dodin |
| 2007/0226086 A1 | 9/2007 | Bauman et al. |
| 2007/0255653 A1 | 11/2007 | Tumminaro et al. |
| 2007/0266257 A1 | 11/2007 | Camaisa et al. |
| 2008/0000052 A1 | 1/2008 | Hong et al. |
| 2008/0005037 A1 | 1/2008 | Hammad et al. |
| 2008/0017702 A1 | 1/2008 | Little et al. |
| 2008/0021787 A1 | 1/2008 | Mackouse |
| 2008/0029608 A1 | 2/2008 | Kellum et al. |
| 2008/0052226 A1 | 2/2008 | Agarwal et al. |
| 2008/0066185 A1 | 3/2008 | Lester et al. |
| 2008/0086398 A1 | 4/2008 | Parlotto |
| 2008/0115104 A1 | 5/2008 | Quinn |
| 2008/0149706 A1 | 6/2008 | Brown et al. |
| 2008/0154772 A1 | 6/2008 | Carlson |
| 2008/0170156 A1 | 7/2008 | Kim |
| 2008/0191878 A1 | 8/2008 | Abraham |
| 2008/0208726 A1 | 8/2008 | Tsantes et al. |
| 2008/0226142 A1 | 9/2008 | Pennella et al. |
| 2008/0229383 A1 | 9/2008 | Buss et al. |
| 2008/0244724 A1 | 10/2008 | Choe et al. |
| 2008/0260119 A1 | 10/2008 | Marathe et al. |
| 2008/0283590 A1 | 11/2008 | Oder et al. |
| 2008/0301043 A1 | 12/2008 | Unbehagen |
| 2008/0319889 A1 | 12/2008 | Hammad et al. |
| 2009/0005269 A1 | 1/2009 | Martin et al. |
| 2009/0007231 A1 | 1/2009 | Kaiser et al. |
| 2009/0055269 A1 | 2/2009 | Baron |
| 2009/0055642 A1 | 2/2009 | Myers et al. |
| 2009/0112763 A1 | 4/2009 | Scipioni et al. |
| 2009/0132351 A1 | 5/2009 | Gibson |
| 2009/0164324 A1 | 6/2009 | Bishop et al. |
| 2009/0205014 A1 | 8/2009 | Doman et al. |
| 2009/0228381 A1 | 9/2009 | Mik et al. |
| 2009/0254447 A1 | 10/2009 | Blades |
| 2009/0254971 A1 | 10/2009 | Herz et al. |
| 2009/0287603 A1 | 11/2009 | Lamar et al. |
| 2009/0319638 A1 | 12/2009 | Faith et al. |
| 2010/0036769 A1 * | 2/2010 | Winters ................. G06Q 20/10 705/40 |
| 2010/0036906 A1 | 2/2010 | Song et al. |
| 2010/0063906 A1 | 3/2010 | Nelsen et al. |
| 2010/0082445 A1 | 4/2010 | Hodge et al. |
| 2010/0082487 A1 | 4/2010 | Nelsen |
| 2010/0094735 A1 | 4/2010 | Reynolds et al. |
| 2010/0100470 A1 | 4/2010 | Buchanan et al. |
| 2010/0114768 A1 | 5/2010 | Duke et al. |
| 2010/0132049 A1 | 5/2010 | Vernal et al. |
| 2010/0199098 A1 | 8/2010 | King |
| 2010/0228671 A1 | 9/2010 | Patterson |
| 2010/0274691 A1 | 10/2010 | Hammad et al. |

(56) References Cited

U.S. PATENT DOCUMENTS

| | | | |
|---|---|---|---|
| 2010/0276484 A1* | 11/2010 | Banerjee | G06Q 30/06 235/379 |
| 2010/0312700 A1 | 12/2010 | Coulter et al. | |
| 2010/0327056 A1 | 12/2010 | Yoshikawa et al. | |
| 2011/0023129 A1 | 1/2011 | Vernal et al. | |
| 2011/0035288 A1 | 2/2011 | Clyne | |
| 2011/0035318 A1 | 2/2011 | Hargrove et al. | |
| 2011/0035596 A1 | 2/2011 | Attia et al. | |
| 2011/0078010 A1 | 3/2011 | Postrel | |
| 2011/0106698 A1 | 5/2011 | Isaacson et al. | |
| 2011/0162057 A1 | 6/2011 | Gottumukkala et al. | |
| 2011/0176010 A1 | 7/2011 | Houjou et al. | |
| 2011/0178929 A1 | 7/2011 | Durkin et al. | |
| 2011/0191177 A1 | 8/2011 | Blackhurst et al. | |
| 2011/0191239 A1 | 8/2011 | Blackhurst et al. | |
| 2011/0196791 A1 | 8/2011 | Dominguez | |
| 2011/0202462 A1 | 8/2011 | Keenan | |
| 2011/0218849 A1 | 9/2011 | Rutigliano et al. | |
| 2011/0247055 A1 | 10/2011 | Guo et al. | |
| 2011/0276479 A1 | 11/2011 | Thomas | |
| 2011/0307826 A1 | 12/2011 | Rivera et al. | |
| 2011/0320246 A1 | 12/2011 | Tietzen et al. | |
| 2012/0024946 A1 | 2/2012 | Tullis et al. | |
| 2012/0030109 A1 | 2/2012 | Dooley Maley et al. | |
| 2012/0041881 A1 | 2/2012 | Basu et al. | |
| 2012/0046994 A1 | 2/2012 | Reisman | |
| 2012/0047072 A1 | 2/2012 | Larkin | |
| 2012/0096534 A1 | 4/2012 | Boulos et al. | |
| 2012/0099780 A1 | 4/2012 | Smith et al. | |
| 2012/0101938 A1 | 4/2012 | Kasower | |
| 2012/0123841 A1 | 5/2012 | Taveau et al. | |
| 2012/0123933 A1 | 5/2012 | Abel et al. | |
| 2012/0124658 A1 | 5/2012 | Brudnicki et al. | |
| 2012/0158590 A1 | 6/2012 | Salonen | |
| 2012/0173387 A1 | 7/2012 | Talker et al. | |
| 2012/0197691 A1 | 8/2012 | Grigg et al. | |
| 2012/0214577 A1 | 8/2012 | Petersen et al. | |
| 2012/0227094 A1 | 9/2012 | Begen et al. | |
| 2012/0239417 A1 | 9/2012 | Pourfallah et al. | |
| 2012/0239479 A1 | 9/2012 | Amaro et al. | |
| 2012/0239670 A1 | 9/2012 | Horn et al. | |
| 2012/0240235 A1 | 9/2012 | Moore | |
| 2012/0246122 A1 | 9/2012 | Short et al. | |
| 2012/0254038 A1 | 10/2012 | Mullen | |
| 2012/0259782 A1 | 10/2012 | Hammad | |
| 2012/0265682 A1 | 10/2012 | Menon | |
| 2012/0265685 A1 | 10/2012 | Brudnicki et al. | |
| 2012/0270522 A1 | 10/2012 | Laudermilch et al. | |
| 2012/0296725 A1 | 11/2012 | Dessert et al. | |
| 2012/0296831 A1 | 11/2012 | Carrott | |
| 2012/0310760 A1 | 12/2012 | Phillips et al. | |
| 2012/0317036 A1 | 12/2012 | Bower et al. | |
| 2013/0006847 A1 | 1/2013 | Hammad et al. | |
| 2013/0031006 A1 | 1/2013 | McCullagh et al. | |
| 2013/0046607 A1 | 2/2013 | Granville, III | |
| 2013/0046690 A1 | 2/2013 | Calman et al. | |
| 2013/0055378 A1 | 2/2013 | Chang et al. | |
| 2013/0080219 A1 | 3/2013 | Royyuru et al. | |
| 2013/0091452 A1 | 4/2013 | Sorden et al. | |
| 2013/0103391 A1 | 4/2013 | Millmore et al. | |
| 2013/0117696 A1 | 5/2013 | Robertson et al. | |
| 2013/0132854 A1 | 5/2013 | Raleigh et al. | |
| 2013/0151405 A1 | 6/2013 | Head et al. | |
| 2013/0173402 A1 | 7/2013 | Young et al. | |
| 2013/0174244 A1 | 7/2013 | Taveau et al. | |
| 2013/0212666 A1 | 8/2013 | Mattsson et al. | |
| 2013/0218649 A1 | 8/2013 | Beal | |
| 2013/0218758 A1 | 8/2013 | Koenigsbrueck et al. | |
| 2013/0226813 A1 | 8/2013 | Voltz | |
| 2013/0240618 A1 | 9/2013 | Hall | |
| 2013/0246258 A1 | 9/2013 | Dessert | |
| 2013/0246272 A1 | 9/2013 | Kirsch | |
| 2013/0254079 A1 | 9/2013 | Murali | |
| 2013/0254115 A1 | 9/2013 | Pasa et al. | |
| 2013/0282542 A1 | 10/2013 | White | |
| 2013/0301392 A1* | 11/2013 | Zhao | H04B 11/00 367/137 |
| 2013/0339124 A1 | 12/2013 | Postrel | |
| 2013/0346302 A1 | 12/2013 | Purves et al. | |
| 2013/0346306 A1 | 12/2013 | Kopp | |
| 2013/0346310 A1 | 12/2013 | Burger et al. | |
| 2014/0006209 A1 | 1/2014 | Groarke | |
| 2014/0019352 A1 | 1/2014 | Shrivastava | |
| 2014/0026193 A1 | 1/2014 | Saxman et al. | |
| 2014/0032419 A1 | 1/2014 | Anderson et al. | |
| 2014/0032723 A1 | 1/2014 | Nema | |
| 2014/0040134 A1 | 2/2014 | Ciurea | |
| 2014/0040144 A1 | 2/2014 | Plomske et al. | |
| 2014/0046827 A1 | 2/2014 | Hochstatter et al. | |
| 2014/0053069 A1 | 2/2014 | Yan | |
| 2014/0067503 A1 | 3/2014 | Ebarle Grecsek et al. | |
| 2014/0067683 A1 | 3/2014 | Varadarajan | |
| 2014/0068030 A1 | 3/2014 | Chambers et al. | |
| 2014/0076967 A1 | 3/2014 | Pushkin et al. | |
| 2014/0081736 A1 | 3/2014 | Blackhurst et al. | |
| 2014/0108260 A1 | 4/2014 | Poole et al. | |
| 2014/0108263 A1 | 4/2014 | Ortiz et al. | |
| 2014/0114780 A1 | 4/2014 | Menefee et al. | |
| 2014/0114855 A1 | 4/2014 | Bajaj et al. | |
| 2014/0122328 A1 | 5/2014 | Grigg | |
| 2014/0123312 A1 | 5/2014 | Marcotte | |
| 2014/0129357 A1 | 5/2014 | Goodwin | |
| 2014/0129448 A1 | 5/2014 | Aiglstorfer | |
| 2014/0143886 A1 | 5/2014 | Eversoll et al. | |
| 2014/0149198 A1 | 5/2014 | Kim et al. | |
| 2014/0149368 A1 | 5/2014 | Lee et al. | |
| 2014/0162598 A1 | 6/2014 | Villa-Real | |
| 2014/0164220 A1 | 6/2014 | Desai et al. | |
| 2014/0172576 A1 | 6/2014 | Spears et al. | |
| 2014/0172707 A1 | 6/2014 | Kuntagod et al. | |
| 2014/0180854 A1 | 6/2014 | Bryant, II | |
| 2014/0198054 A1 | 7/2014 | Sharma et al. | |
| 2014/0200957 A1 | 7/2014 | Biggs | |
| 2014/0207672 A1 | 7/2014 | Kelley | |
| 2014/0237236 A1 | 8/2014 | Kalinichenko et al. | |
| 2014/0248852 A1 | 9/2014 | Raleigh et al. | |
| 2014/0250002 A1 | 9/2014 | Isaacson et al. | |
| 2014/0258104 A1 | 9/2014 | Harnisch | |
| 2014/0258109 A1 | 9/2014 | Jiang et al. | |
| 2014/0258110 A1 | 9/2014 | Davis et al. | |
| 2014/0279309 A1 | 9/2014 | Cowen et al. | |
| 2014/0279474 A1 | 9/2014 | Evans et al. | |
| 2014/0279559 A1 | 9/2014 | Smith et al. | |
| 2014/0282852 A1 | 9/2014 | Vestevich | |
| 2014/0297438 A1 | 10/2014 | Dua | |
| 2014/0306833 A1 | 10/2014 | Ricci | |
| 2014/0324527 A1 | 10/2014 | Kulkarni et al. | |
| 2014/0337188 A1 | 11/2014 | Bennett et al. | |
| 2014/0344149 A1* | 11/2014 | Campos | G06Q 20/3674 705/41 |
| 2014/0344153 A1 | 11/2014 | Raj et al. | |
| 2014/0344877 A1 | 11/2014 | Ohmata et al. | |
| 2014/0357233 A1 | 12/2014 | Maximo et al. | |
| 2014/0365291 A1 | 12/2014 | Shvarts | |
| 2014/0372308 A1 | 12/2014 | Sheets | |
| 2014/0379575 A1 | 12/2014 | Rogan | |
| 2015/0019443 A1 | 1/2015 | Sheets et al. | |
| 2015/0019944 A1* | 1/2015 | Kalgi | G06Q 20/3552 715/205 |
| 2015/0026026 A1 | 1/2015 | Calman et al. | |
| 2015/0026049 A1 | 1/2015 | Theurer et al. | |
| 2015/0026057 A1 | 1/2015 | Calman et al. | |
| 2015/0032625 A1 | 1/2015 | Dill et al. | |
| 2015/0032626 A1* | 1/2015 | Dill | G06Q 20/4016 705/44 |
| 2015/0032627 A1 | 1/2015 | Dill et al. | |
| 2015/0039457 A1 | 2/2015 | Jacobs et al. | |
| 2015/0046338 A1 | 2/2015 | Laxminarayanan et al. | |
| 2015/0046339 A1 | 2/2015 | Wong et al. | |
| 2015/0066768 A1 | 3/2015 | Williamson et al. | |
| 2015/0070132 A1 | 3/2015 | Candelore | |
| 2015/0073989 A1 | 3/2015 | Green et al. | |
| 2015/0079932 A1 | 3/2015 | Zelinka et al. | |
| 2015/0081349 A1 | 3/2015 | Johndrow et al. | |

(56) References Cited

U.S. PATENT DOCUMENTS

| | | |
|---|---|---|
| 2015/0082042 A1 | 3/2015 | Hoornaert et al. |
| 2015/0088633 A1 | 3/2015 | Salmon et al. |
| 2015/0088756 A1 | 3/2015 | Makhotin et al. |
| 2015/0095238 A1 | 4/2015 | Khan et al. |
| 2015/0096039 A1 | 4/2015 | Mattsson et al. |
| 2015/0100477 A1 | 4/2015 | Salama et al. |
| 2015/0100495 A1 | 4/2015 | Salama et al. |
| 2015/0106239 A1 | 4/2015 | Gaddam et al. |
| 2015/0112870 A1 | 4/2015 | Nagasundaram et al. |
| 2015/0121500 A1 | 4/2015 | Venkatanaranappa et al. |
| 2015/0127524 A1 | 5/2015 | Jacobs et al. |
| 2015/0127547 A1 | 5/2015 | Powell et al. |
| 2015/0128215 A1 | 5/2015 | Son et al. |
| 2015/0132984 A1 | 5/2015 | Kim et al. |
| 2015/0134700 A1 | 5/2015 | Macklem et al. |
| 2015/0142673 A1 | 5/2015 | Nelsen et al. |
| 2015/0149272 A1 | 5/2015 | Salmon et al. |
| 2015/0149357 A1 | 5/2015 | Ioannidis et al. |
| 2015/0154595 A1 | 6/2015 | Collinge et al. |
| 2015/0178724 A1 | 6/2015 | Ngo et al. |
| 2015/0180836 A1 | 6/2015 | Wong et al. |
| 2015/0186856 A1 | 7/2015 | Weiss et al. |
| 2015/0193639 A1 | 7/2015 | Esposito et al. |
| 2015/0193764 A1 | 7/2015 | Haggerty et al. |
| 2015/0193866 A1 | 7/2015 | Van Heerden et al. |
| 2015/0199679 A1 | 7/2015 | Palanisamy et al. |
| 2015/0199689 A1 | 7/2015 | Kumnick et al. |
| 2015/0200495 A1 | 7/2015 | Yu et al. |
| 2015/0213435 A1 | 7/2015 | Douglas et al. |
| 2015/0220999 A1 | 8/2015 | Thornton et al. |
| 2015/0221149 A1 | 8/2015 | Main et al. |
| 2015/0229622 A1 | 8/2015 | Grigg et al. |
| 2015/0242853 A1 | 8/2015 | Powell |
| 2015/0248405 A1 | 9/2015 | Rudich et al. |
| 2015/0254635 A1 | 9/2015 | Bondesen et al. |
| 2015/0254638 A1* | 9/2015 | Bondesen ............... G06Q 20/36 705/41 |
| 2015/0254646 A1 | 9/2015 | Harkey et al. |
| 2015/0254647 A1 | 9/2015 | Bondesen et al. |
| 2015/0254655 A1 | 9/2015 | Bondesen et al. |
| 2015/0254656 A1 | 9/2015 | Bondesen et al. |
| 2015/0269566 A1 | 9/2015 | Gaddam et al. |
| 2015/0277712 A1 | 10/2015 | Ratcliffe et al. |
| 2015/0286834 A1 | 10/2015 | Ohtani et al. |
| 2015/0287133 A1 | 10/2015 | Marlov et al. |
| 2015/0295906 A1 | 10/2015 | Ufford et al. |
| 2015/0312038 A1 | 10/2015 | Palanisamy |
| 2015/0319158 A1 | 11/2015 | Kumnick |
| 2015/0319198 A1 | 11/2015 | Gupta et al. |
| 2015/0324592 A1 | 11/2015 | Dutta |
| 2015/0332067 A1 | 11/2015 | Gorod |
| 2015/0339663 A1 | 11/2015 | Lopreiato et al. |
| 2015/0339664 A1 | 11/2015 | Wong et al. |
| 2015/0371221 A1 | 12/2015 | Wardman |
| 2015/0372999 A1 | 12/2015 | Pi-Sunyer |
| 2015/0379508 A1 | 12/2015 | Van |
| 2016/0004741 A1 | 1/2016 | Johnson et al. |
| 2016/0026997 A1 | 1/2016 | Tsui et al. |
| 2016/0028550 A1 | 1/2016 | Gaddam et al. |
| 2016/0028735 A1 | 1/2016 | Francis et al. |
| 2016/0036790 A1 | 2/2016 | Shastry et al. |
| 2016/0042381 A1 | 2/2016 | Braine et al. |
| 2016/0063497 A1 | 3/2016 | Grant, IV |
| 2016/0065370 A1 | 3/2016 | Le Saint et al. |
| 2016/0078428 A1 | 3/2016 | Moser et al. |
| 2016/0080403 A1 | 3/2016 | Cunningham et al. |
| 2016/0092696 A1 | 3/2016 | Guglani et al. |
| 2016/0092870 A1 | 3/2016 | Salama et al. |
| 2016/0092872 A1 | 3/2016 | Prakash et al. |
| 2016/0092874 A1 | 3/2016 | O'Regan et al. |
| 2016/0098577 A1 | 4/2016 | Lacey et al. |
| 2016/0098692 A1 | 4/2016 | Johnson et al. |
| 2016/0109954 A1 | 4/2016 | Harris et al. |
| 2016/0119296 A1 | 4/2016 | Laxminarayanan et al. |
| 2016/0125405 A1 | 5/2016 | Alterman et al. |
| 2016/0125409 A1 | 5/2016 | Meredith et al. |
| 2016/0127892 A1 | 5/2016 | Huang et al. |
| 2016/0140221 A1 | 5/2016 | Park et al. |
| 2016/0149875 A1 | 5/2016 | Li et al. |
| 2016/0155156 A1 | 6/2016 | Gopal et al. |
| 2016/0171483 A1 | 6/2016 | Luoma et al. |
| 2016/0173483 A1 | 6/2016 | Wong et al. |
| 2016/0180302 A1 | 6/2016 | Bagot, Jr. |
| 2016/0189121 A1 | 6/2016 | Best et al. |
| 2016/0217461 A1 | 7/2016 | Gaddam et al. |
| 2016/0232600 A1 | 8/2016 | Purves |
| 2016/0239437 A1 | 8/2016 | Le et al. |
| 2016/0239835 A1 | 8/2016 | Marsyla |
| 2016/0239840 A1 | 8/2016 | Preibisch |
| 2016/0260084 A1 | 9/2016 | Main et al. |
| 2016/0260176 A1 | 9/2016 | Bernard et al. |
| 2016/0267467 A1 | 9/2016 | Rutherford et al. |
| 2016/0267480 A1 | 9/2016 | Metral |
| 2016/0292673 A1 | 10/2016 | Chandrasekaran |
| 2016/0294879 A1 | 10/2016 | Kirsch |
| 2016/0307229 A1 | 10/2016 | Balasubramanian et al. |
| 2016/0314458 A1 | 10/2016 | Douglas et al. |
| 2016/0321669 A1 | 11/2016 | Beck et al. |
| 2016/0328522 A1 | 11/2016 | Howley |
| 2016/0328577 A1 | 11/2016 | Howley |
| 2016/0358163 A1 | 12/2016 | Kumar et al. |
| 2016/0371471 A1 | 12/2016 | Patton et al. |
| 2016/0373458 A1* | 12/2016 | Moreton ............... H04L 63/126 |
| 2016/0379211 A1 | 12/2016 | Hoyos et al. |
| 2017/0004506 A1 | 1/2017 | Steinman et al. |
| 2017/0011215 A1 | 1/2017 | Poiesz et al. |
| 2017/0011389 A1 | 1/2017 | McCandless et al. |
| 2017/0011450 A1 | 1/2017 | Frager et al. |
| 2017/0024393 A1 | 1/2017 | Choksi et al. |
| 2017/0068954 A1 | 3/2017 | Hockey et al. |
| 2017/0078299 A1 | 3/2017 | Castinado et al. |
| 2017/0078303 A1 | 3/2017 | Wu |
| 2017/0091759 A1 | 3/2017 | Selfridge et al. |
| 2017/0132633 A1 | 5/2017 | Whitehouse |
| 2017/0147631 A1 | 5/2017 | Nair et al. |
| 2017/0161724 A1 | 6/2017 | Lau |
| 2017/0249478 A1 | 8/2017 | Lovin |
| 2017/0344991 A1 | 11/2017 | Mark et al. |
| 2017/0352028 A1 | 12/2017 | Vridhachalam et al. |
| 2017/0364898 A1 | 12/2017 | Ach et al. |
| 2018/0005323 A1 | 1/2018 | Grassadonia |
| 2018/0006821 A1 | 1/2018 | Kinagi |
| 2018/0025145 A1 | 1/2018 | Morgner et al. |
| 2018/0053200 A1 | 2/2018 | Cronin et al. |
| 2018/0088909 A1 | 3/2018 | Baratta et al. |
| 2018/0158137 A1 | 6/2018 | Tsantes et al. |
| 2018/0270363 A1 | 9/2018 | Guday et al. |
| 2018/0276628 A1 | 9/2018 | Radiotis et al. |
| 2018/0349922 A1 | 12/2018 | Carlson et al. |
| 2018/0357440 A1 | 12/2018 | Brady et al. |
| 2018/0373891 A1 | 12/2018 | Barday et al. |
| 2019/0007381 A1 | 1/2019 | Isaacson et al. |
| 2019/0171831 A1 | 6/2019 | Xin |
| 2019/0197501 A1 | 6/2019 | Senci et al. |
| 2019/0220834 A1 | 7/2019 | Moshal et al. |
| 2019/0228173 A1 | 7/2019 | Gupta et al. |
| 2019/0228428 A1 | 7/2019 | Bruner et al. |
| 2019/0228430 A1 | 7/2019 | Givol et al. |
| 2019/0318122 A1 | 10/2019 | Hockey et al. |
| 2019/0325161 A1 | 10/2019 | Zavesky et al. |
| 2019/0332802 A1 | 10/2019 | Barday et al. |
| 2019/0333061 A1 | 10/2019 | Jackson et al. |
| 2019/0347442 A1 | 11/2019 | Marlin et al. |
| 2019/0354979 A1 | 11/2019 | Crawford |
| 2019/0356641 A1 | 11/2019 | Isaacson et al. |
| 2019/0362069 A1 | 11/2019 | Park et al. |
| 2019/0369845 A1 | 12/2019 | Rucker |
| 2019/0370798 A1 | 12/2019 | Hu et al. |
| 2019/0392443 A1 | 12/2019 | Piparsaniya et al. |
| 2020/0005347 A1 | 1/2020 | Boal |
| 2020/0074552 A1 | 3/2020 | Shier et al. |
| 2020/0090179 A1 | 3/2020 | Song et al. |
| 2020/0118114 A1 | 4/2020 | Benkreira et al. |

(56) References Cited

U.S. PATENT DOCUMENTS

| | | | |
|---|---|---|---|
| 2020/0118133 | A1 | 4/2020 | Schmidt et al. |
| 2020/0286057 | A1 | 9/2020 | Desai |
| 2021/0303335 | A1 | 9/2021 | Foreman et al. |

FOREIGN PATENT DOCUMENTS

| | | | |
|---|---|---|---|
| CN | 104106276 B | | 10/2014 |
| EP | 1 259 947 A2 | | 11/2002 |
| EP | 1 770 628 A2 | | 4/2007 |
| GB | 2 441 156 | | 2/2008 |
| KR | 20160015375 A | | 2/2016 |
| WO | WO-90/13096 A1 | | 11/1990 |
| WO | WO-00/72245 | | 11/2000 |
| WO | WO-03/038551 | | 5/2003 |
| WO | WO-2004/081893 | | 9/2004 |
| WO | WO-2004/090825 A1 | | 10/2004 |
| WO | WO-2009/151839 A1 | | 12/2009 |
| WO | WO-2011/017613 A2 | | 2/2011 |
| WO | WO-2012/054148 | | 4/2012 |
| WO | WO-2013/082190 A1 | | 6/2013 |
| WO | WO-2015/103443 | | 7/2015 |
| WO | WO-2015/135131 A1 | | 9/2015 |
| WO | WO-2016/015054 A1 | | 1/2016 |
| WO | WO-2016/025291 A1 | | 2/2016 |
| WO | WO-2017/035399 A1 | | 3/2017 |
| WO | WO-2018/005635 A1 | | 1/2018 |

OTHER PUBLICATIONS

Smartphones as Practical and Secure Location Verification Tokens for Payments. file:///C:/Users/eoussir/Documents/e-Red% 20 Folder/15496961 /N PL_ Smartphones %20as %20Practical %20and %20Secure %20 Location %20Verification %20Tokens %20for% 20Payments. pdf (Year: 2014).

Urein et al: "A breakthrough for prepaid payment: End to end token exchange and management using secure SSL channels created by EAP-TLS smart cards", 2011 International Conference on Collaboration Technologies and Systems (CTS) (Year: 2011).

Yang MH. Security enhanced EMV-based mobile payment protocol. Scientific World Journal. 2014.https://www.ncbi.nlm.nih.gov/ pmc/articles/PMC4181509/ (Year: 2014).

Eickhoff et al: "Quality through Flow and Immersion: Gamifying Crowdsourced Relevance Assessments" ,Proceedings of the 35th international ACM SIGIR conference on Research and development in information retrieval, Aug. 12, 2012. (Year: 2012).

ASB, "How to command your cards with ASB Card Control" Apr. 20, 2015, https://www.youtube.com/watch?v=O1sfxvVUL74 (Year: 2015).

Austin Telco Federal Credit Union, "Lost or Stolen Cards", www.atfcu.org/lost-stolen-cards.htm; Apr. 9, 2004. 6 pages.

Authorize.Net. Authorize.Net Mobile Application: iOS User Guide. Sep. 2015. Authorize.Net LLC. Ver.2.0, 1-23. https://www.authorize.net/content/dam/anet-redesign/documents/iosuserguide.pdf(Year: 2015).

BancFirst, "Lost Card", https://www.bancfirst.com/contact.aspx, Oct. 28, 2003. 1 page.

CM/ECF, "CM/ECF Internet Credit Card Payment Guide", https://www.vaeb.uscourts.gov/wordpress/?page_id=340, Mar. 16, 2005. 12 pages.

CO-OP THINK, Rachna Ahlawat at CO-OP THINK—Evolution Sessions from THINK14, Dec. 22, 2014, 26:22. https://www.youtube.com/watch?v=yEp-qfZoPhl (Year: 2014).

Cronian, Darrin "Credit card companies Freeze Spending whilst Abroad", published Jun. 9, 2007, Available at: http://www.travel-rants.com/2007/06/09/credit-card-companies-freeze-spending-whilst-abroad/.

Fiserv. CardValet: Mobile Application Training. Fiserv, Inc. 1-93. https://www.westernbanks.com/media/1664/ cardvalet-application .pdf (Year: 2015).

Fort Knox Federal Credit Union, "Lost or Stolen VISA Card", http://www.fortknoxfcu.org/loststolen.html, Feb. 1, 2001. 2 pages.

IEEE Xplore; 2009 First Asian Himalayas International Conference on Internet: Emergence of Payment Systems in the age of Electronic Commerce.; The state off Art. Author S Singh Nov. 1, 2009 pp. 1-18 (Year: 2009).

IP.com Search Query; May 5, 2020 (Year: 2020).

Konsko: "Credit Card Tokenization: Here's What You Need to Know", Credit Card Basics, Credit Card—Advertisement Nerdwallet (Year: 2014).

Merrick Bank, "Reporting Lost or Stolen Card Help Return to the Cardholder Center FAQs", http://www.merrickbank.com/Frequent-Asked-Questions/Report-Stolen-Card.aspx, Aug. 9, 2004. 1 page.

Microsoft, "Automatically summarize a document", 2016. 3 pages.

Non-Final Office Action on U.S. Appl. No. 15/862,494 dated Oct. 22, 2021.

Non-Final Office Action on U.S. Appl. No. 16/027,018 dated May 26, 2020.

Non-Final Office Action on U.S. Appl. No. 17/118,254 dated Oct. 28, 2021.

Notre Dame FCU "Irish Card Shield: How to Control Transaction Types" Jan. 15, 2016, 0:27, https://youtube.com/watch?v=0eZG1c6Bn38 (Year: 2016).

PCM Credit Union, "CardValet Tutorial" Jun. 24, 2015, https://www.youtube.com/watch?v=uGPh9Htw0Wc (Year: 2015).

Purchasing charges ahead. (1994). Electronic Buyers' News,, 68. Retrieved from https://dialog.proquest.com/professional/docview/681599288?accountid=131444 on Nov. 13, 2020 (Year: 1994).

RBC Royal Bank, "If Your Card is Lost or Stolen", http://www.rblbank.com/pdfs/CreditCard/FAQs.pdf, Oct. 1, 2002. 2 pages.

State Employees Credit Union, "Lost or Stolen Account Info", https://www.secumd.org/advice-planning/money-and-credit/privacy-fraud-protection/lost-or-stolen-account-info.aspx, May 20, 2005. 2 pages.

Transaction aggregation as a strategy for credit card fraud detection. file:///C:/Users/eoussir/Downloads/Transaction_aggregation_as_a_ strategy for credit_c. pdf (Year: 2009).

Union Bank & Trust, "Report Lost or Stolen Card", http://www.ubt.com/security-fraud/report-lost-or-stolen-cards, Jul. 10, 2005. 13 pages.

Using location aware business rules for preventing retail banking frauds. https://ieeexplore.ieee.org/stamp/stamp.jsp?tp=&arnumber=7351936 (Year: 2015).

Demiriz et al. "Using Location Aware Business Rules for Preventing Retail Banking Frauds" Jan. 15, 2015, IEEE (Year: 2015).

Diversinet enables new consumer mobile services from intersections inc.; MobiSecure wallet and vault helps identity management leader get closer to its customers. (May 30, 2007). PR Newswire Retrieved from https://dialog.proquest.com/professional/docview/450976918?accountid=131444 on Feb. 22, 2023 (Year: 2007).

Hinze et al.; Event-Based Applications and Enabling Technologies. https://www.researchgate.net/profile/Annika-Hinze/publication/220796268_Event-based_applications_and_enabling_technologies/Links/0fcfd 50b638d9592a1000000/Event-based-applications-and-enabling-technologies.pdf (Year: 2009).

Technologies for Payment Fraud Prevention: EMV, Encryption, and Tokenization, Oct. 2014, Smart Card Alliance, pp. 1-34 (Year: 2014).

Yang, Ming-Hour; Security Enhanced EMV-Based Mobile Payment Protocol. https://patents.google.com/scholar/ 15767854982483958498?q (Security Enhanced EMV-Based Mobile Payment Protocol)&patents=false&scholar&oq=Security Enhanced EMV-Based Mobile Payment Protocol (Year: 2014).

* cited by examiner

CONNECTED PAYMENT CARD SYSTEMS AND METHODS

CROSS-REFERENCE TO RELATED APPLICATIONS

This application is a continuation of and claims priority to U.S. patent application Ser. No. 15/360,275, filed Nov. 23, 2016, which is a continuation of and claims priority to U.S. patent application Ser. No. 15/054,633, filed Feb. 26, 2016, which claims the benefit of and priority to U.S. Patent Application No. 62/199,783, filed Jul. 31, 2015, the contents of all of which are hereby incorporated by reference in their entireties.

BACKGROUND

Payment cards can be provided in many forms beyond a plastic card with a magstripe. Payment cards can be provided with on-board integrated circuits and can be provisioned to mobile devices for mobile wallet transactions. Such arrangements can be used for both in-person and on-line transactions. However, while payment cards reduce the need to carry physical currency, payment card transactions can entail security risks. Further, many existing systems manage security issues on an account-by-account basis. As such, a customer may have to freeze or close an entire payment card account as a result of a security breach at a single merchant. Resorting to an account-wide freeze can be significantly disruptive, particularly where the customer has a limited number of available payment source accounts.

SUMMARY

One example embodiment relates to a financial institution computing system. The system includes a token database, a network interface circuit, and a token management circuit. The token database retrievably stores a plurality of tokens and token information associated with each of the plurality of tokens. The network interface circuit enables the financial institution computing system to exchange information over a network. The token management circuit is configured to enable a graphical user interface on a customer device over the network. The token management circuit is further configured to cause a new token to be provisioned in response to a new token command generated by the graphical user interface. The token management circuit is configured to cause a token to be re-provisioned in response to a re-provision token command generated by the graphical user interface. The token management circuit is further configured to enable and disable tokens in the token database in response to management commands generated by the graphical user interface. Transactions against a customer payment card account using an enabled token are completed, and transactions against the customer payment card account using a disabled token are denied.

Another example embodiment relates to a method of enabling real time payment card account management for customers of a financial institution, including management of physical payment cards, as performed by one or more circuits at a financial institution computing system. The method includes retrievably storing, by a token database, a plurality of tokens and token information associated with each of the plurality of tokens. The method further includes enabling, by a network interface circuit, the financial institution computing system to exchange information over a network. The method includes enabling, by a token management circuit, a graphical user interface on a customer device over the network. The method further includes responding, by the token management circuit, to requests provided by the graphical user interface, including causing a new token to be provisioned in response to a new token request, causing a token to be re-provisioned in response to a re-provision token request, and enabling and disabling tokens in the token database in response to management requests. A transaction against a customer payment card account using an enabled token is completed, and wherein a transaction against the customer payment card account using a disabled token is denied.

Yet another arrangement relates to a non-transitory computer readable media having computer-executable instructions embodied therein that, when executed by a processor of a financial institution computing system, cause the financial institution computing system to perform operations to enable real time payment card account management for customers of a financial institution, including management of physical payment cards. The operations include retrievably storing, by a token database, a plurality of tokens and token information associated with each of the plurality of tokens. The operations further include enabling, by a network interface circuit, the financial institution computing system to exchange information over a network. The operations include enabling, by a token management circuit, a graphical user interface on a customer device over the network. The operations further include responding, by the token management circuit, to requests provided by the graphical user interface, including causing a new token to be provisioned in response to a new token request, causing a token to be re-provisioned in response to a re-provision token request, and enabling and disabling tokens in the token database in response to management requests. A transaction against a customer payment card account using an enabled token is completed, and wherein a transaction against the customer payment card account using a disabled token is denied.

DETAILED DESCRIPTION

Figure 1:
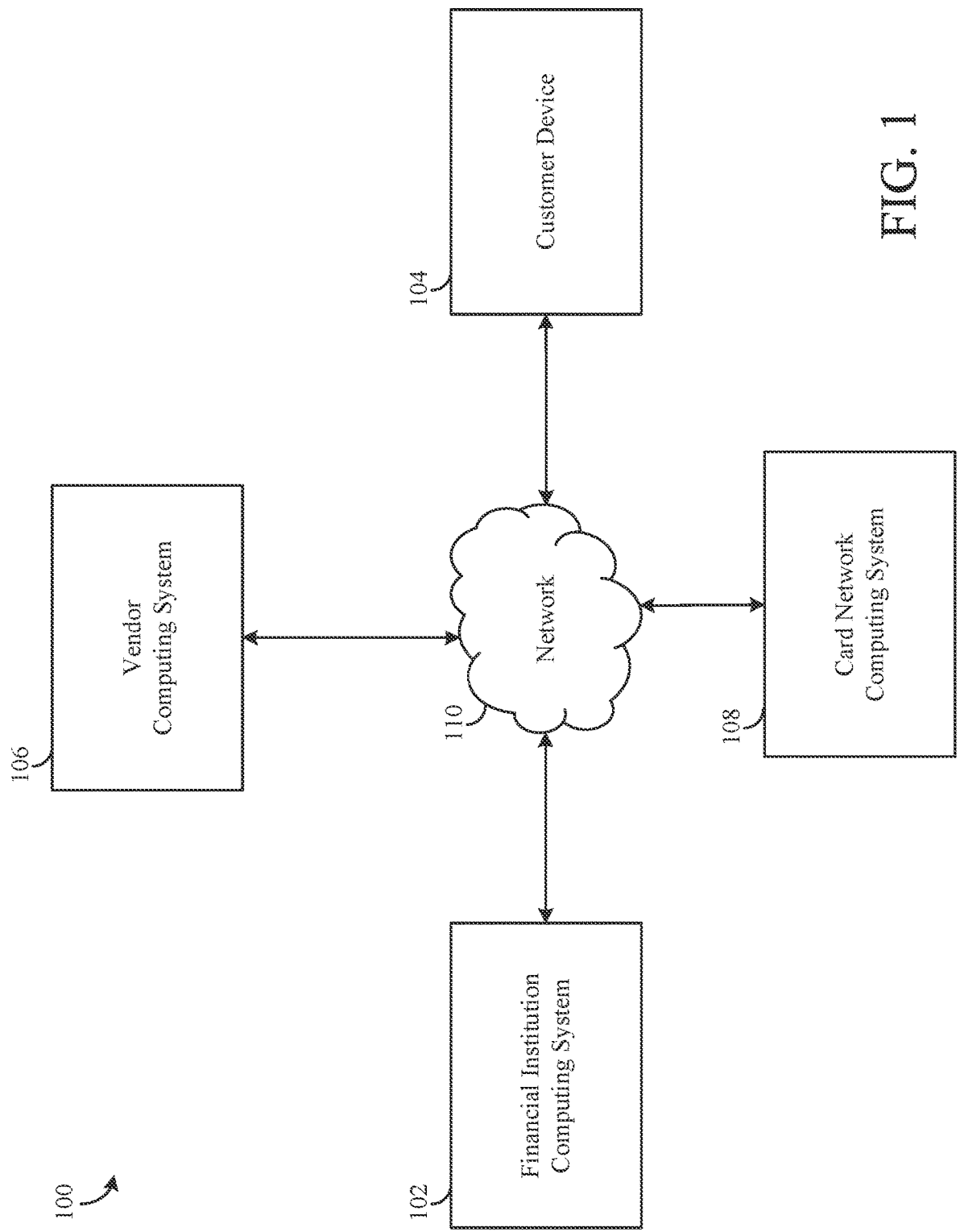
FIG. 1 is a block diagram illustrating a payment card and token provisioning system, according to an example embodiment.

Referring to FIG. 1, a payment processing system 100 includes a financial institution computing system 102, a customer device 104, a merchant computing system 106, and a card network computing system 108. A network 110 enables components of the system 100 to communicate with each other. The network 110 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 110 includes the internet.

In example embodiments, payment processing system 100 uses payment tokens to facilitate payments to merchants. In example embodiments, payment tokens may be surrogate values that replace the primary account number (PAN) associated with a payment card, such as a credit card, debit card, stored value card, etc. Payment tokens may pass basic validation rules of an account number. Hence, the payment token for a credit card in many respects "looks like" a real credit card number, but in fact is only a token. As part of the token generation process, steps are taken such that the generated payment token does not have the same value as or conflict with a real primary account number (e.g., a real credit card number). Payment tokens may be provisioned to various locations for use in various types of payment scenarios, including remote storage at a merchant (e.g., a card-on-file database) for on-line transactions with the merchant, a secure storage element ("secure element") located in a payment card for a point-of-sale transaction using the payment card, local device storage (e.g., internal memory of a mobile device) for a mobile/digital wallet transaction, and so on.

In example embodiments, to process payment transactions, a payment is processed using a payment token in lieu of a primary account number (e.g., the 16-digit account number on the front of a credit card). The merchant obtains the payment token from a customer device or from the payment card, and then submits the payment token through a payment network to a computing system associated with a card network (e.g., Visa®, MasterCard®, American Express®, Discover®, Diners Club®, etc.). The card network computing system detokenizes the payment token to obtain the PAN, i.e., replaces the payment token for its associated PAN value based on the payment token-to-PAN mapping information stored in a token database (sometimes referred as a "token vault"). The card network computing system then transmits the PAN to the card issuer (e.g., the customer's financial institution) for processing in a manner similar to a traditional credit card transaction. For example, the card issuer may approve the transaction, in which case the transaction with the merchant is completed and payment to the merchant is made. The token database may also maintain other information that may be used to apply restrictions or other controls during transaction processing.

In example embodiments, processing payment transactions using such payment tokens provides enhanced security in connection with the payment card transactions. The payment tokens may be limited to use, e.g., only in connection with a specific merchant or a specific channel (e.g., payment via a specific mobile wallet). For example, in the event of a data breach at a merchant, the risk of subsequent fraud is reduced because only the payment tokens are exposed instead of primary account numbers. In this example, the payment tokens are merchant-specific and therefore cannot be used at other merchants. Although the examples provided herein relate primarily to the use of payment tokens (which may be used to originate payment transactions), the systems and methods described herein may also be used with and non-payment tokens (which may be used for ancillary processes, such as loyalty tracking), as described in greater detail below.

Referring again in detail to FIG. 1, the financial institution computing system 102 is a computing system at a financial institution that is capable of maintaining customer accounts (e.g., payment card accounts, such as credit card accounts, demand deposit accounts having an associated debit card, stored value card accounts, and so on) and databases of customer information. In the context of the present disclosure, the financial institution can include commercial or private banks, credit unions, investment brokerages, and so on.

The customer device 104 is a computing system associated with a customer of the financial institution. The customer device 104 includes one or more processors and non-transitory storage mediums housing one or more logics configured to allow the customer device 104 to exchange data over the network 110, execute software applications, access websites, generate graphical user interfaces, and perform other operations. Examples of the customer device 104 include laptop computers, desktop computers, mobile devices (tablets, smartphones, wearable computing devices such as eyewear, etc.), and so on.

The merchant computing system 106 is a computing system associated with a merchant with which a customer of the financial institution may transact. Examples of merchants include, for example, retailers, wholesalers, marketplace operators, service providers (e.g., loan servicers, cleaning services, transportation providers, digital wallet services, and so on), and so on. In some arrangements, the merchant computing system 106 is used to create and store data relating to customer transactions (e.g., purchases and refunds). In some such arrangements, the merchant computing system 106 can store databases of information relating to customers such as names, shipping addresses, contact information, and so on. Further, the merchant computing system 106 may be able to operate customer loyalty programs (e.g., membership programs, points programs, frequent shopper discounts, and so on).

The card network computing system 108 is a computing system associated with a card network. Examples of card networks include Visa®, MasterCard®, American Express®, Discover®, Diners Club®, etc. In some embodiments, the card network computing system 108 generates tokens for payment cards. The card network computing system 108 performs operations associated with the generation and issuance of payment tokens. The card network computing system 108 also maintains the established mapping of payment tokens-to-PANs in a token database (or token vault). The card network computing system 108 also detokenizes payment tokens during processing of payment transactions to determine actual account numbers.

Figure 2:
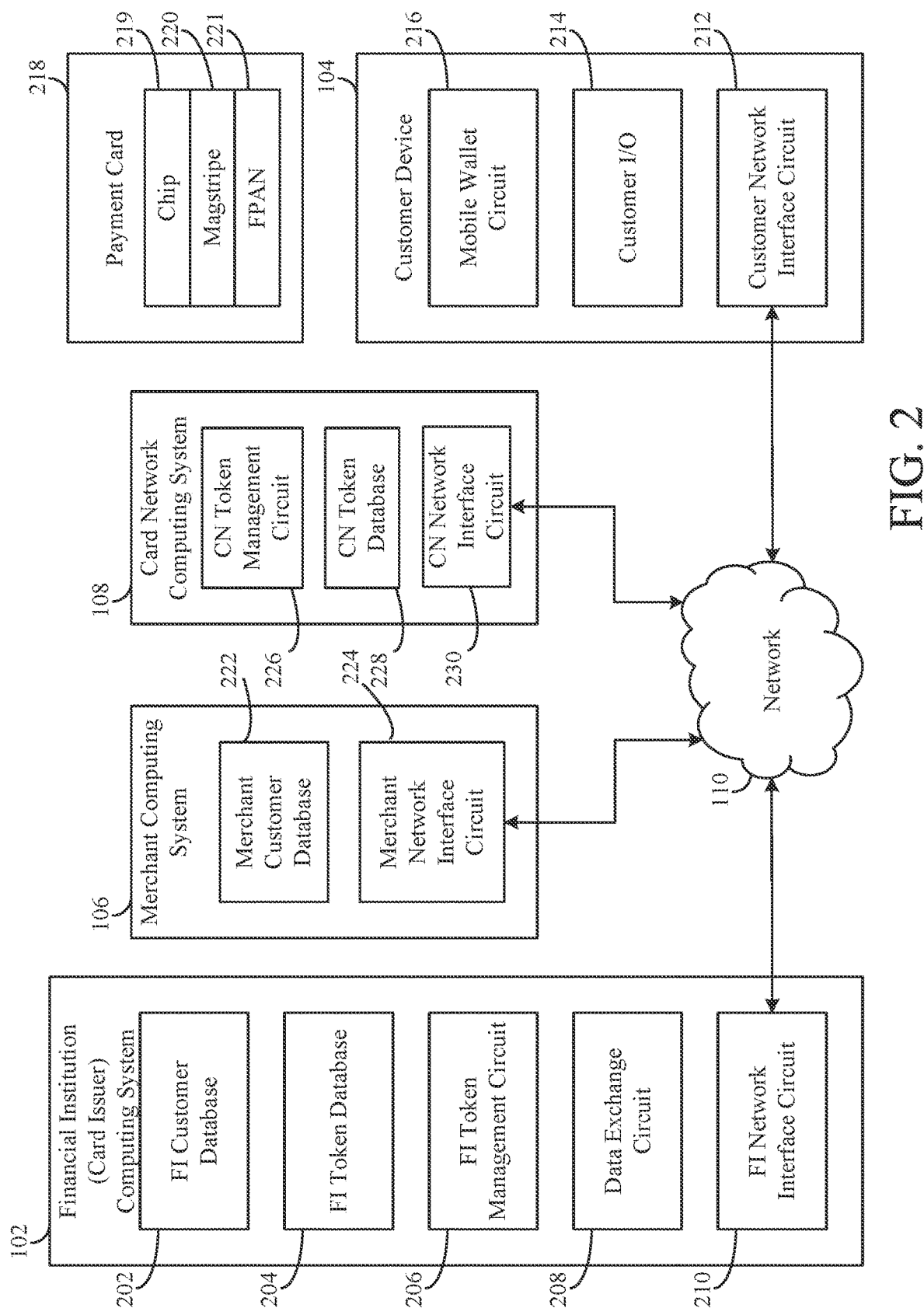
FIG. 2 is a block diagram illustrating additional features of the payment card and token provisioning system shown in FIG. 1.

Referring now to FIG. 2, system 100 is shown in greater detail according to one example embodiment. In FIG. 2, the financial institution computing system 102 includes a FI customer database 202, a token database 204, a token management circuit 206, a data exchange circuit 208, and an FI network interface circuit 210. The FI network interface circuit 210 is configured to allow the financial institution computing system 102 and the various components therein to exchange data over the network 110.

The FI customer database 202 allows the financial institution computing system 102 to retrievably store customer information relating to the various operations discussed herein, and may include non-transient data storage mediums (e.g., hard drives, local network servers, and the like) or remote data storage facilities (e.g., cloud servers). The FI customer database 202 includes personal customer information (e.g., names, addresses, phone numbers, and so on), identification information (e.g., social security numbers, driver's license numbers, biometric data, and so on), customer financial information (e.g., account numbers, account balances, available credit, credit history, transaction histories, etc.), and so on.

The token database 204 is a storage medium which may be similar to the FI customer database 202, except that the token database 204 stores token information. The token database 204 may be a token vault that is maintained by the FI computing system 102. Hence, in some embodiments, the payment tokens are generated by the card network computing system 108, and payment token-to-PAN mapping information is maintained by the card network computing system 108; and, in addition, the payment token-to-PAN mapping information is also maintained by the FI computing system 102. For example, in some embodiments, the FI computing system 102 may provide additional token-related management services to customers that are not available through the card network computing system 108. Such services may be useful in situations where customers have multiple different types of accounts, e.g., multiple different types of credit cards, such that a single card network computing system does not have a global view of all of the payment tokens in existence for a given customer. Such services may also be useful in situations in which information in addition to account numbers is tokenized by FI computing system 102 (or other computing systems), thereby creating tokens that are not payment tokens.

To this end, in some embodiments, the token management circuit 206 is configured to enable such services. The services may be provided both in connection with non-payment tokens and in connection with payment tokens. Regarding non-payment tokens, in one aspect, the token management circuit 206 can generate a new unique code to be provisioned as a token, and associate a discrete piece of data with the new unique code (e.g., information other than a payment card number). The new unique code then becomes a token, which may be exchanged among computing devices.

In another aspect, with regard to payment tokens, the token management circuit 206 may be configured to cooperate with card network computing system 108 to activate and deactivate individual payment tokens. In other words, the token management circuit 206 may be configured to provide token-related management services to customers to activate and deactivate individual payment tokens or to otherwise configure permissions associated with such tokens. For example, a customer opening a new credit card account may be assigned a primary account number (PAN) specifically identifying that new account (e.g., a sixteen-digit credit card account number) by the FI computing system 102 and/or by the card network computing system 108. The customer may engage in transactions with one or more merchants, each of which may be assigned a payment token specific to each merchant or to a specific payment channel (e.g., a specific brand of mobile wallet). The card network computing system 108 may generate each of the payment tokens and provide information about the payment tokens to the FI computing system 102. The token management circuit 206 may be configured to cooperate with card network computing system 108 to maintain the payment tokens over their lifecycle in the databases 204 and 228.

In some embodiments, the token management circuit 206 provides a token management hub tool accessible via the customer device 104. The token management hub may be provided as a graphical user interface and presented to a customer via the customer device 104. The customer can access the management hub through via an online banking website, via a mobile banking tool provided to a mobile device, and/or in another manner. The customer may be required to provide login credentials (e.g., username and password, biometrics, etc.). Upon authenticating the customer, the data exchange circuit 208 may transmit account information for that customer from the FI customer database 202 and/or the token database 204 to the customer device 104 to provide the token management hub.

The management hub provides the customer with information relating to tokens provisioned by the card network computing system 108 and/or the FI computing system 102 and related permissions, and allows the customer to manage the tokens. The management hub may also allow the customer to monitor payment tokens issued for a given payment account. For example, the management hub may serve as an interface between the financial institution computing system 102 and the customer, wherein the customer can selectively allow and disallow transactions involving specific payment card accounts with individual merchants, service providers, and digital wallet services. In some arrangements, allowing and disallowing transactions can be performed by activating and deactivating individual payment tokens. Further, PANs may be activated or deactivated at the management hub to selectively enable and disable all transactions involving a particular payment card account. In addition, in some arrangements, the management hub can provide the customer with an alert that a payment token has been reprovisioned when a given payment token is compromised (e.g., in the event of a security breach at a corresponding merchant computing system 106, or a new PAN where a physical credit card is lost).

For example, after a customer opens a new payment card account, the customer may subsequently lose the payment card associated with the card account. However, the customer may be unsure whether the payment card has simply been temporarily misplaced, or whether the payment card has been permanently lost. The customer may be provided with the ability to access the token management hub to temporarily deactivate the payment card for use with all merchants. Subsequently, the customer may locate the payment card, and utilize the token management circuit to reactivate the payment card. Alternatively, the customer may decide that the payment card is permanently lost, and the token management circuit 206 may interact with the card network computing system 108 to deactivate the payment card and cause a new payment card to be issued. Once the new payment card is created, the card network computing system 108 may operate to generate new payment tokens to replace the payment tokens associated with the old payment card, and circulate the new payment tokens to the respective merchants associated with the old payment tokens.

As another example, the management hub may also allow the customer to monitor payment tokens issued for a given payment account. For example, the management hub can provide a list of all merchants having a payment token corresponding to a given payment card account. As such, the customer may be able to see whether any new or unusual payment tokens have been provided without the permission of the customer (e.g., where a fraudster in possession of the payment card attempts to transact with a new merchant). A new or unusual payment token appearing in the management hub circuit 212 may indicate that the payment card has been compromised. For example, a fraudster may obtain a user's credit card information, and use that credit card information in an online transaction, thereby triggering the creation of a fraudulent payment token at the online merchant. The customer may subsequently realize that the payment card has been compromised and may have the payment card deactivated. However, the customer may also recognize the existence of the unusual/fraudulently-created payment token at the unknown merchant prior to the deactivation. The customer may then deactivate that specific payment token for that merchant, thereby causing the financial institution computing system 102 to deny any future transactions for the payment card involving that merchant using the fraudulently-created payment token.

Additionally, the customer may choose to allow or disallow future transactions with a given merchant by updating permissions associated with a corresponding payment token. For example, a customer may visit a merchant once (e.g., while on vacation, while purchasing a gift for a relative, etc.). Such a merchant may be a merchant that the customer is unlikely to visit again. Hence, the customer may decide to deactivate the payment token for that merchant, since the customer is unlikely to visit that merchant again. As another example, the customer may have purchased an item from a service that provides automatic renewals, such that the customer is charged on a periodic basis (e.g., the customer is charged a $24.99 monthly service fee unless the customer takes steps to prevent the fee). In such a situation, the customer may deactivate the payment token for that merchant to prevent such unwanted recurring fees from being charged in the future.

As another example, the management hub may permit the customer to sort tokens according to various parameters, such as by merchant category, most recent transaction date, transaction amount and so on. For example, the customer may be provided with the ability to sort merchant-specific payment tokens by merchant classification code. In this manner, the customer may identify payment tokens associated with merchants that do not fit into the categories of merchants from which the user normally purchases goods/services, which may suggest that those tokens were fraudulently created. On this basis, the user may decide to deactivate such tokens or the entire payment card. Likewise, the customer may sort payment tokens by most recent transaction date and decide, e.g., to deactivate any payment token that has not been used in the past year.

As another example, the management hub can be used to provide information to customers about token activity. For example, if there is a data breach at a particular merchant, the card network computing system 108 may deactivate the payment token for that merchant and reprovision a new payment token for use with that merchant. The management hub can provide the customer with an alert that a payment token has been reprovisioned responsive to the data breach.

The data exchange circuit 208 of the FI computing system 102 is configured to exchange data among the FI customer database 202, the token database 204, the merchant computing system 106, and the customer device 104. In one aspect, the data exchange circuit 208 may be configured to exchange tokens and permissions with the token database 204 and external computing systems (e.g., the merchant computing system 106 and the customer device 104). For example, the data exchange circuit 208 may provide a new token received from the card network computing system 108 to a customer device 104.

The customer device 104 includes customer network interface circuit 212 and customer I/O devices 214. The customer network interface circuit 212 is configured to allow the customer device 104 to exchange data over the network 110. The customer I/O 214 includes hardware and associated logics configured to enable a customer to exchange information with the customer device 104. An input aspect of the customer I/O 214 allows the customer to provide information to the customer device 104, and can include, for example, a mechanical keyboard, a touchscreen, a microphone, a camera, a fingerprint scanner, a user input device engageable to the customer device 104 (e.g., via a USB, mini USB, or micro USB port, etc.), and so on. In turn, an output aspect of the customer I/O 214 allows the customer to receive information from the customer device 104, and can include, for example, a digital display, a speaker, LEDs, and so on.

In some situations, the customer device 104 may receive and display screens including account information, transaction instructions, and so on. In one embodiment, a screen may be used to request a username and password information from the user, to prompt the user to provide information regarding the amount of a payment and which merchant or individual (e.g., name, address, phone number or e-mail, a selection of a recipient by the user from his/her memory or from the customer device 104, etc.) is to receive the payment. Such screens are presented to the user via the display device portion of the customer I/O 214. An input device portion of the customer I/O 214 may be used to permit the user to initiate account access and to facilitate receiving requested information from the user.

In some situations, the customer device 104 may be a mobile device, such as a cellular phone, smart phone, mobile handheld wireless e-mail device, wearable device, portable gaming device, or other suitable device. In some embodiments, the mobile device may include a mobile wallet client application 216. The mobile wallet client application 216 or mobile wallet circuit may include program logic executable by mobile device 104 to implement at least some of the functions described herein. In order to make the mobile wallet circuit 216, the FI computing system 102 may provide a software application and make the software application available to be placed on the mobile device 104. For example, the FI computing system 102 may make the software application available to be downloaded (e.g., via the online banking website of the mobile wallet bank, via an app store, or in another manner). Responsive to a user selection of an appropriate link, the mobile wallet application may be transmitted to the mobile device and may cause itself to be installed on the mobile device 104. Installation of the software application creates the mobile wallet circuit on the mobile device 104. Specifically, after installation, the thus-modified mobile device 104 includes the mobile wallet circuit (embodied as a processor and instructions stored in non-transitory memory that are executed by the processor).

In some situations, payment is made using a payment card 218. The payment card 218 is a physical payment card associated with a payment card account (e.g., a credit card account, a checking account, a prepaid account, etc.) for a given customer, and is capable of exchanging information stored in memory in the payment card 218. The payment card 218 can also include visible information on the face of the card.

The payment card 218 includes a chip 219, a magstripe 220, and a PAN indicator field 221. The PAN indicator field 221 conveys an account number corresponding to a customer payment card account, and may be printed or embossed on the physical payment card 218 (e.g., along with a customer name, expiration date, security codes, etc.). The magstripe 220 is a magnetically-responsive strip disposed on the face of the payment card 218. The magstripe 220 is configured to store a limited amount of information (e.g., a payment card account number, a customer name, expiration date, etc.), e.g., in Track 1/Track 2 format. The chip 219 is a defining feature of the "smart" aspect of the payment card 218. The chip 219 is a small circuitry system configured to exchange data via electrical contacts, RFID communication, NFC communication, or in another manner. The chip 219 can be configured to be able to selectively transmit various types of information, including payment card information (e.g., account numbers, issuing entities, and so on), identifying customer information (e.g., customer name, billing address, phone number, and so on).

In some arrangements, in addition to the PAN which is displayed in PAN indicator field 221, the payment card 218 is further provided with channel-specific payment tokens in the chip 219 and the magstripe 220. The PAN displayed in indicator field 221, the channel-specific token stored in the chip 219, and the channel-specific token stored in the magstripe 220 may each be different numbers. Hence, rather than being programmed with the PAN, the chip 219 and the magstripe 220 are programmed with channel-specific payment tokens which are each different than the PAN. Accordingly, if a transaction involves the customer entering payment card information into an online interface (e.g., a checkout section of an online merchant), then the transaction is completed using the PAN of the payment card as presented in indicator field 221. Specifically, the merchant may transmit the PAN to the card network computing system 108 via the payment network, and the card network computing system 108 may return a payment token to the merchant computing system 106 to store in database 222 for future card-on file transactions. Likewise, if a transaction involves the customer swiping the payment card at a point of sale, then the transaction is completed using the payment token stored in the magstripe 220. Likewise, if a transaction involves the customer inserting the payment card into a chip reader at a point of sale, then the transaction is completed using the payment token stored in the chip 219. As such, the FI computing system 102 may be able to distinguish customer transactions completed via the PAN displayed on the front of the card (e.g., where a payment card account number is provided to an online merchant), the magstripe 220 (e.g., at a magstripe reader at a merchant point of sale), or the use of the chip 219 (e.g., at a chip reader at a merchant point of sale).

In some arrangements, the chip 219 stores customer information in addition to payment card account information. For example, customer identification information may be stored at the chip 219 (e.g., a name and address of the customer, driver's license number, a customer portrait image, etc.). In some embodiments, rather than storing the identification information itself, a token is stored that may be exchanged for the identification information. As such, the chip 219 may be used by a merchant computing device 106 for personal identification of the customer (e.g., to pick up airline tickets at an automated kiosk). For example, the merchant computing system 106 may read the identification information directly from the chip 219, or may submit the token to the FI computing system 102, depending on where the identification information is stored.

In some embodiments, e.g., in situations where a token is stored rather than the identification information itself, the customer may access token management circuit 206 in order to update the information associated with the token. Hence, each time a transaction occurs, the merchant computing system 106 may submit the token to the FI computing system 102 in order to verify that the address information stored by the merchant computing system 106 for the customer is the most recent/up-to-date information.

In some embodiments, the information that is stored (either locally on the chip 219 or remotely accessible via a token) may include information for the merchant to establish a loyalty account. Hence, rather than ask the customer to fill out a form to provide information to establish a loyalty account, the merchant computing system 106 may instead read the information used to create the loyalty account from the payment card 218.

In some embodiments, merchant or financial institution loyalty programs may be implemented with loyalty account numbers that are specific to each customer, and the loyalty account numbers (or tokens representing the loyalty account numbers) may be stored on the chip 219. As such, the loyalty account numbers may be retrieved from a chip reader (e.g., at every transaction involving the payment card 218), e.g., thereby avoiding the need for the customer to separately present a loyalty card or a phone number associated with the loyalty account at the point of sale. In other embodiments, each customer may be assigned a unique ID that is universal across multiple loyalty programs. Hence, the merchant computing system 106 may be configured to identify the customer based on the unique ID, and then provide loyalty program rewards to the customer using the unique ID as the basis for identifying the customer.

As another example, in some embodiments, the chip 219 may be read/writable by the merchant computing system 106 (e.g., the merchant point-of sale-device can read from and write to the chip 219). In such embodiments, rewards balance information may be stored directly on the payment card 218, and used as currency in future transactions with the merchant.

The merchant computing system 106 includes a merchant customer database 222 and a merchant network interface circuit 224. The merchant network interface circuit 224 is configured to allow the merchant computing system 106 to exchange data over the network 110. The merchant customer database 222 is a local or remote data storage system, and may be configured to store customer information relevant for completing purchase transactions. For example, the merchant customer database 222 can include customer names, shipping addresses, billing addresses, payment card information (e.g., tokens), phone numbers, and so on.

The card network computing system 108 comprises a token management circuit 226 and a token database 228. The token management circuit 226 is configured to generate and manage tokens associated with payment cards. The token database 228 maintains the mapping of payment tokens-to-PANs, such that payment tokens may be detokenized during processing of payment transactions to determine actual account numbers. The card network computing system 108 also includes a network interface circuit 230 which is configured to allow the card network computing system 108 to exchange data over the network 110.

Referring now to FIGS. 3A-3D, as previously indicated, the customer may use the customer device 104 to manage payment tokens via the token management circuit 206. For example, the customer may enable and disable financial transactions with individual merchants (e.g., merchants associated with the merchant computing system 106) against one or more payment cards. Further, in some arrangements, the customer may also be able to selectively enable and disable exchanges of customer data (e.g., customer names, shipping addresses, contact information, and the like), by type of customer data and/or by individual merchants. The customer device 104 may also be used to secure a payment card account in the event that the payment card account is compromised at a specific merchant, or the new payment card account itself is compromised. Such an arrangement is shown in greater detail in FIGS. 3A-3D.

Figure 3A:
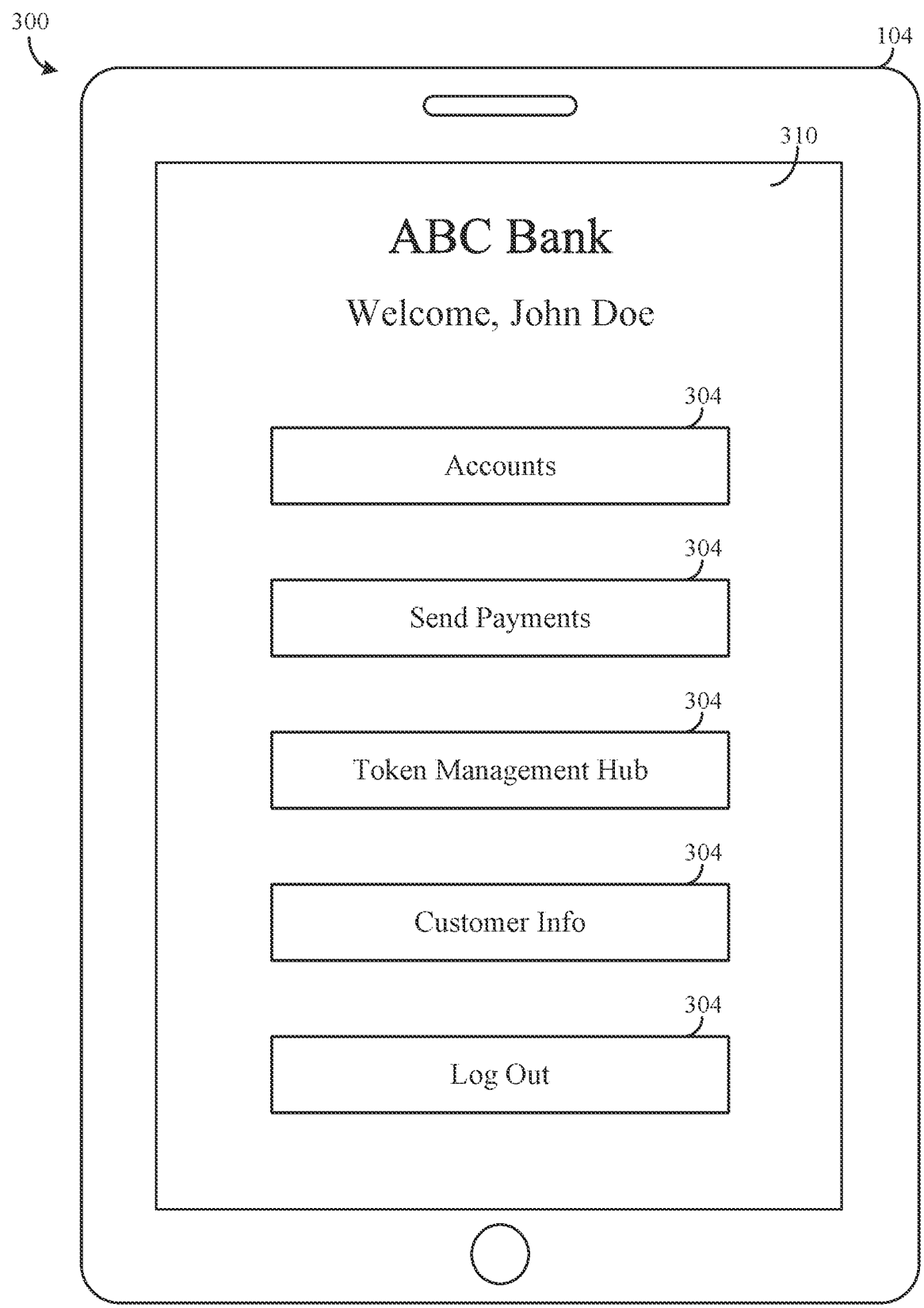
FIGS. 3A-3D are depictions of various screens generated on a user interface, which may be used to facilitate a payment transaction, according to example embodiments.

Referring first in detail to FIG. 3A, an example graphical user interface ("GUI") 300 is provided on a user device 104 (e.g., via the customer I/O 214). The GUI 300 is generated by the token management circuit 206. In one arrangement, the GUI 300 presents a customer with a welcome page 310 after the user provides authorizing credentials (e.g., a username and password, an entry of biometric data, or the like via the customer I/O 214). The welcome page 310 includes a plurality of menu buttons 304, each of the menu buttons 304 being labeled with a corresponding action that the token management circuit 206 may perform (e.g., see account information, send payments, etc.). Included among the menu buttons 304 is a labeled button corresponding to the management hub.

Figure 3B:
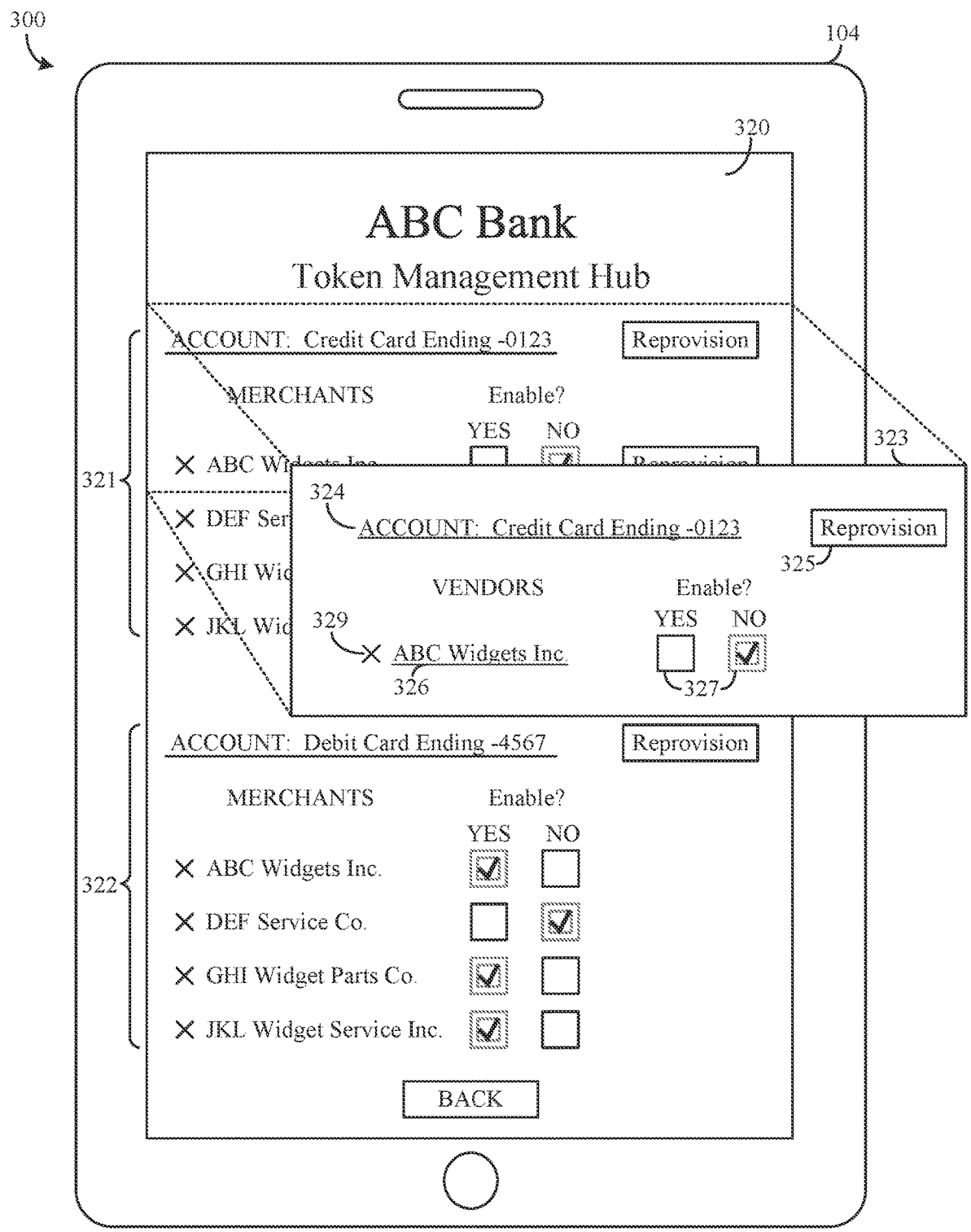

Referring now to FIG. 3B, in response to a user selection of the management hub option within the menu buttons 304 provided in FIG. 3A, the GUI 300 has refreshed to show a management hub page 320. Information provided on the management hub page 320 includes information from the token database 204, which may be accessed and transmitted by the data exchange circuit 208 over the network 110 via the FI network interface circuit 210. In one arrangement, the management hub page 320 is organized into a first payment card account section 321 and a second payment card account section 322. Each payment card account section corresponds to a payment card account provided by the financial institution associated with the financial institution computing system 102. As shown in FIG. 3B, two payment card account sections are provided, indicating that the user is associated with two payment card accounts.

A sample window 323 (i.e., highlighted for illustrative purposes) of a portion of the first payment card account section 321 is provided to indicate various types of information provided in a given payment card account section. The sample window 323 includes a payment card account identifier 324 (e.g., identifying a credit card with a PAN ending in "-0123"). In one arrangement, a user can select a PAN reprovisioning button 325, thereby causing the management circuit 206 to initiate issuance of a new payment card with a new PAN to the customer. (As will be appreciated, although certain terminology is used in the user interface example of FIGS. 3A-3D, other terminology may also be used in practice.) The token management circuit 206 may then cooperate with the card network computing system 108 to generate a new PAN for a new payment card, generate new payment tokens for the new payment card, distribute those payment tokens to merchants and other channels, and update the token databases 204 and 228.

The sample window 323 also includes a merchant identifier 326. The merchant identifier 326 specifies a merchant to which a payment token has been assigned. Using a pair of enabling toggles 327, a user may adjust the payment token permissions stored at the token database 204 for each merchant associated with a given payment card account. Upon choosing to disable a given payment token via the corresponding enabling toggle 327, the token management circuit 206 disallows any additional transactions for the merchant corresponding to the merchant identifier 326 involving the payment card account associated with the payment card account identifier 324. Disabling the payment token may involve updating corresponding data in the token database 204. In turn, choosing to enable the payment token will cause the token management circuit 206 to allow such transactions.

In addition, if a user no longer wishes to transact with a given merchant, or if a payment token was created accidentally or fraudulently, the user may select a payment token deletion button 329 to remove a corresponding payment token from the token database 204 altogether.

Figure 3C:
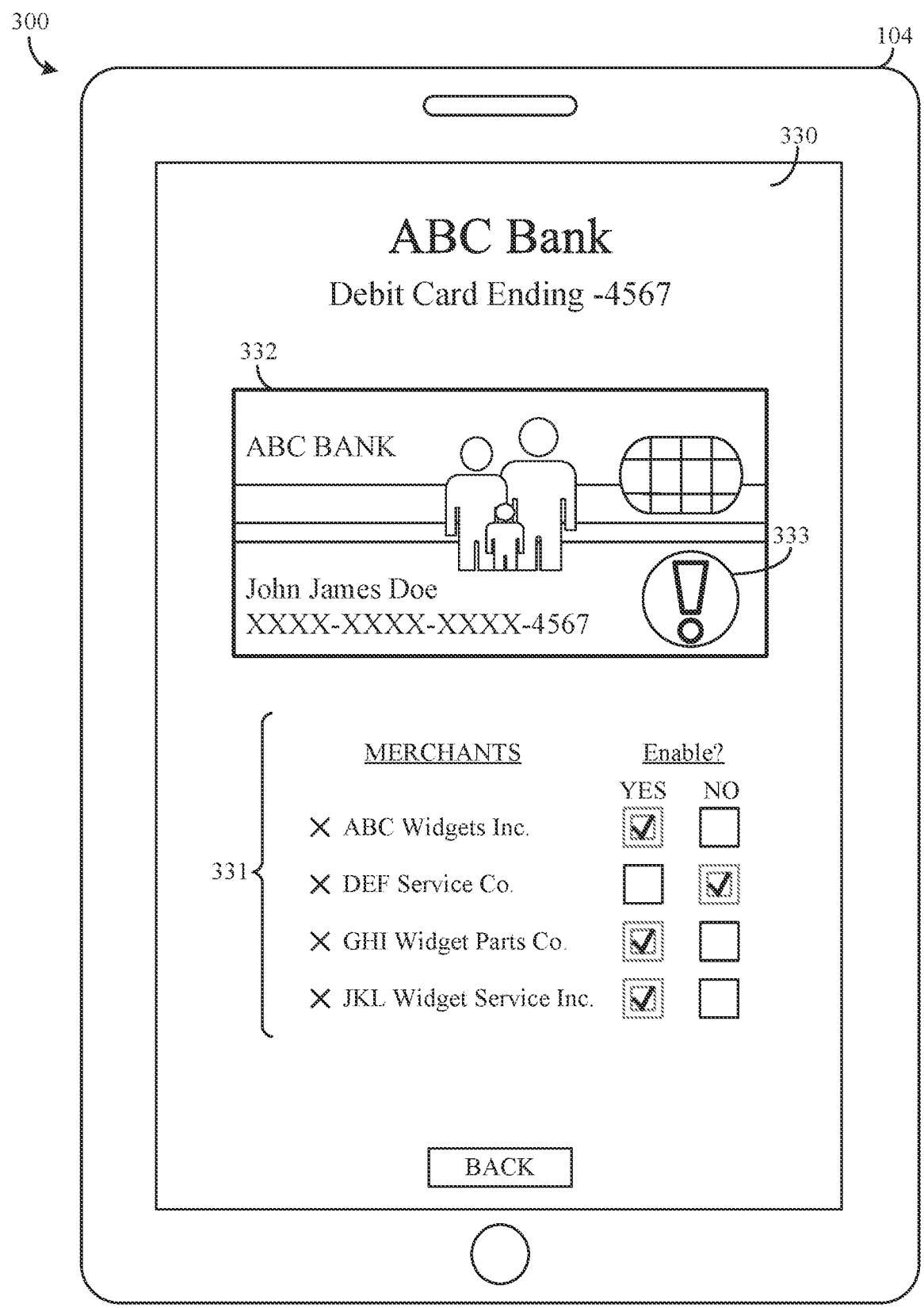

Referring now to FIG. 3C, in some arrangements, the GUI 300 can provide an account page 330 specific to a given payment card account. The account page 330 can include a single payment card account section 331 having information and functionalities similar to that offered by payment card account sections (e.g., the first payment card account section 321 and the second payment card account section 322) in the account security hub page 320 (e.g., token management functions).

In some arrangements, the account page 330 includes a representative card image 332. The card image 332 may represent the appearance of a physical payment card corresponding to a given payment card account. For example, where a customer was provided a physical payment card bearing a customized image on a front side of the card (e.g., a favorite picture such as a picture of a family member(s), a pet, a landscape, etc.), the card image 332 may include the customized image as well. The card image 332 may be stored in the FI customer database 202, and provided to the customer device 104 over the network 110 after the customer hub circuit 212 is set up (e.g., via the data exchange circuit 208 in cooperation with the FI network interface circuit 210).

In some embodiments, the card image (e.g., as presented via mobile wallet circuit 216) can change at a point of sale to reflect characteristics of the point of sale transaction. For example, if the customer is at a pet store, the card image may change to show a picture of the customer's pet. Conversely, if the customer is at a floral shop, the card image may change to show a picture of the customer's spouse/significant other. The mobile wallet circuit 216 may be configured to determine point of sale characteristics via, for example, a GPS functionality at the customer device 104, or access to a local wireless network associated with a given merchant.

The card image 332 may also include a notification 333. In some arrangements, the notification 333 is incorporated into the card image 332 (e.g., as a symbol as shown, as an indicative color of a corresponding color code, or the like). The notification 333 can provide notice to a user of some status or condition relating to the payment card account corresponding to the account page 330. For example, information in the FI customer database 202 may show that a card payment is coming due, that a certain amount of a balance or credit limit or budget has been expended, or some other aspect may need attention. Such information may be reflected in the notification 333 as a color (e.g., red for approaching or exceeding spending limits), a symbol (e.g., an exclamation mark for an upcoming due date), or the like. In some arrangements, the notification 333 is a selectable button, wherein the GUI 300 refreshes to provide the user with an appropriate screen (e.g., a payments screen, a transaction history screen, etc.).

Figure 3D:
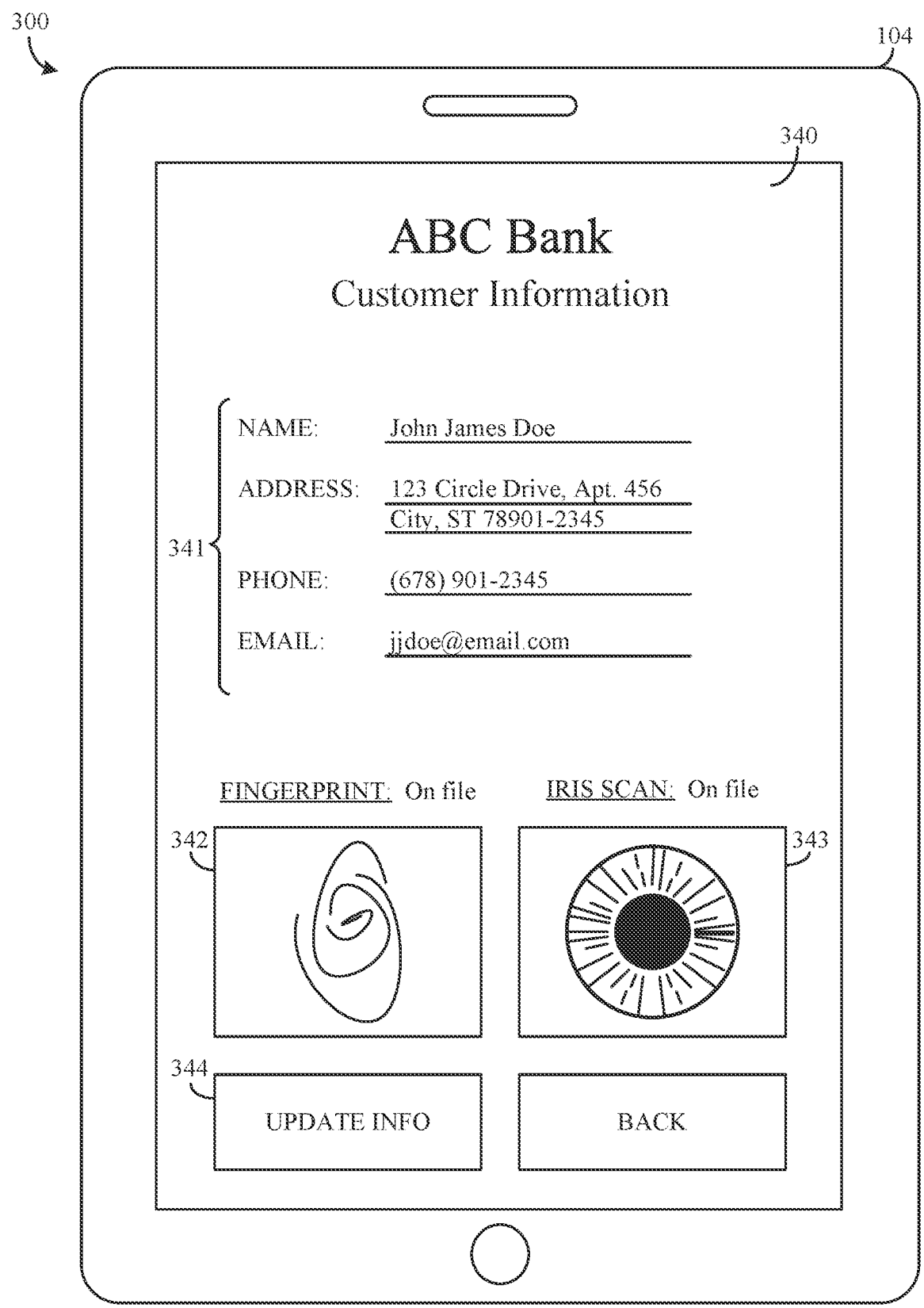

Referring now to FIG. 3D, the GUI 300 may provide a customer information page 340 (e.g., responsive to a user selection of a menu button 304 on the welcome page 310 corresponding to customer information). In some arrangements, the customer information page 340 includes an information listing 341 corresponding to personal and identifying information in textual form. For example, the information listing 341 may include a name, address, phone number, and email address. Other similar types of information may be included in the information listing 341 as well. Further, in some arrangements, the customer information page 340 may reflect successful collection of customer biometric data. For example, a stored fingerprint 342 and iris scan 343 specific to the user may be included or acknowledged in the customer information page 340. Such information may then, for example, also be propagated to other user devices, such that the user can use the same biometrics to access other devices.

In some arrangements, a user may be able to select an update button 344 in order to update or revise the information in the customer information page 340. Information in the customer information page 340 may be stored in the FI customer database 202 at the financial institution computing system 102, and exchanged with the customer device 104 and the merchant computing system 106 via the data exchange circuit 208 (e.g., over the network 110 by the FI network interface 210). Further, some or all of the information in the customer information page 340 may be stored in the chip 219 of the issued payment card 218. Upon selecting the update button 344, updated or revised information can be received by the customer device 104 (e.g., via an appropriate aspect of the customer I/O 214), and then transmitted to the data exchange circuit 208 over the network 110. The data exchange circuit 208 may store the updated or revised information in the FI customer database 202 as well as circulate it to the merchant computing system 106. The data exchange circuit 208 may also cause the chip 219 to be updated, for example during a data exchange with the financial institution computing system 102 at a point of sale or a brick and mortar banking location, or by issuing a new payment card 218 with an updated chip 219.

As such, the GUI 300 can be configured to provide a way for the customer to update information at the FI customer database 202. For example, after a customer moves to a new residence, the customer may access the customer information page 340 on the customer device 104, select the update button 344, and enter an updated mailing address into the customer device 104. The customer device 104 subsequently transmits the updated mailing address to the financial institution computing system 102 over the network 110, where it is received by the data exchange circuit 208. The data exchange circuit 208 may store the updated mailing address in the FI customer database 202.

In some arrangements, the data exchange circuit 208 may also provide the updated mailing address to one or more merchant computing systems 106. In one such arrangement, the data exchange circuit 208 accesses the token database 204 to identify merchants corresponding to customer-enabled payment tokens (e.g., via the enabling toggles 327). Upon identifying such merchants, the data exchange circuit 208 may transmit the updated mailing address to their respective merchant computing systems 106 over the network 110 via the FI network interface circuit 210.

In another such arrangement, the data exchange circuit 208 accesses the FI customer database 202 to identify merchants corresponding to previous payment transactions. For example, the data exchange circuit 208 may be configured to search through transaction histories of a customer in the FI customer database 202 to identify such merchants. In some arrangements, the data exchange circuit 208 may be configured to limit the search to transactions within a specific timeframe (e.g., within the past year, within the past six months, etc.). Further, the data exchange circuit 208 may be configured to also confirm that any merchants identified in the transaction histories correspond to customer-enabled tokens in the manner discussed above.

The data exchange circuit 208 may transmit the updated mailing address to a merchant computing system 106 upon receiving and processing the updated mailing address on a rolling basis or in batches. Alternatively, the data exchange circuit 208 may provide the updated mailing address to a merchant computing system 106 upon receiving a transaction request from the merchant computing system 106. In effect, the next time the customer orders from one of the customer-enabled merchants, the customer may not need to provide the updated mailing address to complete the transaction. Other types of customer information (e.g., phone numbers, email addresses, identification information, loyalty program information, etc.) may be updated in a similar manner.

In addition, in some arrangements, token management circuit 206 is configured to provide some or all aspects of the GUI 300 on multiple channels, enabling the GUI 300 to be viewed and manipulated by multiple users. For example, a financial institution I/O (e.g., similar to the customer I/O 214, but disposed at a financial institution facility) may be configured to allow a customer service representative to interface with the financial institution computing system 102. The token management circuit 206 may be configured to provide the GUI 300 at both the financial institution I/O and the customer I/O 214 simultaneously (e.g., over the network 110 via the FI network interface circuit 210). As such, the customer service representative may be able to guide a customer through GUI 300 in real time. In addition, both the customer service representative and the customer may perform any of the operations discussed above while simultaneously viewing the same pages of the GUI 300.

Figure 4:
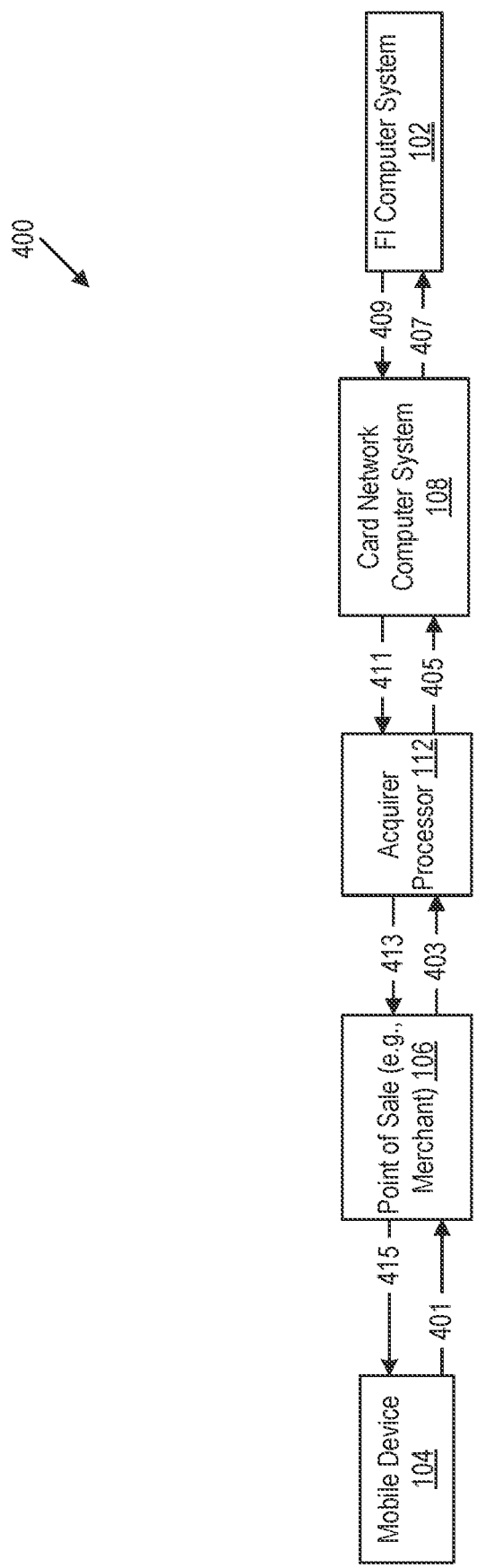
FIG. 4 is a flowchart of a method of provisioning a payment card, according to an example embodiment.

FIG. 4 illustrates a process 400 that may be implemented by the system of FIGS. 1-2. By way of example, FIG. 4 shows a mobile wallet transaction. As will be appreciated, the system 100 supports other types of transactions as well, such as card on file transactions, card present transactions, and so on.

When a user wishes to make a payment at a merchant, for example, the user may access the mobile wallet client application 216 by entering a PIN or other login credentials and then selecting a "pay now" or similar button. For example, the user may be located at a merchant location and may wish to pay for a good or service. As another example, the user may be located away from the merchant location or be engaged in an online transaction.

At step 401, the mobile device 104 may transmit a payment token to merchant computer system 140 (e.g., using a QR code, NFC, wireless, Bluetooth, low energy Bluetooth, RFID, hypersonic, Wi-Fi, cellular 3G, 4G, GSM, LiFi, or other method). In some embodiments, the payment token is provisioned to the mobile wallet circuit 216 in advance and is reused for many mobile wallet transactions. In other embodiments, the payment token is dynamically provisioned to the mobile wallet circuit 216. For example, when the user selects the "pay now" button, the mobile wallet circuit 216 may send a request to a mobile wallet computer system (not shown) which, in response, provisions a one-time payment token to the mobile wallet circuit 216.

At step 403, after receiving the payment token, the merchant computer system 104 sends the transaction to an acquirer processor computer system 112 for processing. Next, at step 405, the acquirer processor computer system 112 sends the payment token to the card network computer system 108 for processing a payment. The card network computer system 108 detokenizes the payment token, thereby resulting in the actual card number (PAN). At step 407, the card network computer system 108 sends the PAN to the FI computer system 102. The FI computer 102 then processes the transaction, for example, by approving the transaction based on the account status of the user (e.g., by confirming that the user has not exceed the credit limit of their credit card). The FI computer system 102 may then send an approval to the merchant computing system 106 via the card network computer system 108, the acquirer processor 112 (steps 409-413), and the payment to the merchant is made. Upon receiving the approval message, the point of sale system 140 may generate a receipt for the user. In some embodiments, the receipt may be sent to the mobile device 110 electronically. In other embodiments, the receipt may be printed physically at the point of sale location.

In the preceding example, it is assumed that the user pays the merchant with a pre-existing payment card (i.e., from a payment card account that was in existence prior to the user visiting the merchant). In other situations, the user may pay the merchant with a new payment card. For example, the user may be at a merchant that has an online mechanism for creating a credit application for a merchant-specific payment card (e.g., a store-branded credit card). For example, the customer may use the mobile device 104 to download and install a merchant software application. Using the software application, at the point of sale, the customer may apply for and open a new payment card account (e.g., a new credit card account). The financial institution associated with the merchant-specific payment card may then electronically activate the new payment card and provision the new payment card to the customer (e.g., to a mobile wallet application executed by the customer device 104). The customer may then use the new payment card at the point of sale. At the same time, the physical payment card may be mailed to the customer, and the customer may activate the physical payment card upon receipt in the mail.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As used herein, "circuit" may include program logic executable by hardware disposed at a computing system to implement at least some of the functions described herein. Embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, handheld devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A system, comprising:
   a token database storing one or more merchant-specific tokens that are mapped to corresponding payment card accounts and respective merchants, each of the one or more merchant-specific tokens associated with a respective status that is one of enabled or disabled; and
   a token management circuit configured to:
   display a graphical user interface on a customer device, wherein the graphical user interface includes a list of user interface elements each identifying a respective merchant-specific token of the one or more merchant-specific tokens, wherein each user interface element in the list comprises a selectable element that causes the token management circuit to enable or disable the respective merchant-specific token;
   receive, from the customer device, a request to update user information associated with the customer device that is different from the one or more merchant-specific tokens, the request comprising updated user information;
   identify, responsive to receiving the request to update the user information, one or more merchants involved in previous payment transactions using the at least one of the one or more merchant-specific tokens;
   identify one or more confirmed merchants from the one or more merchants that correspond to a subset of the one or more merchant-specific tokens that are enabled; and
   transmit, responsive to identifying the one or more confirmed merchants, the updated user information to a computing device associated with each of the one or more confirmed merchants.

2. The system of claim 1, wherein the graphical user interface includes a merchant deletion field, and wherein the token management circuit deletes a selected merchant-specific token in response to receiving a deletion request from the graphical user interface caused by selection of the merchant deletion field.

3. The system of claim 2, wherein the merchant deletion field is separate from the selectable element.

4. The system of claim 2, wherein the merchant deletion field is displayed as part of the list of user interface elements.

5. The system of claim 1, wherein the token management circuit assigns the status of disabled to a selected merchant-specific token in response to a user input without deleting the selected merchant-specific token and without removing a corresponding user interface element from the list.

6. The system of claim 5, wherein the token management circuit prevents a transaction using the selected merchant-specific token responsive to assigning the status of disabled to the selected merchant-specific token.

7. The system of claim 1, wherein the token management circuit sorts the list of user interface elements in response to receiving a sort request from the graphical user interface.

8. The system of claim 7, wherein the token management circuit sorts the list of user interface elements based on a merchant classification code associated with each respective merchant-specific token.

9. The system of claim 7, wherein the token management circuit sorts the list of user interface elements based on a most recent transaction date associated with each respective merchant-specific token.

10. The system of claim 7, wherein the token management circuit sorts the list of user interface elements based on a transaction amount associated with each respective merchant-specific token.

11. A method, comprising:
    storing, by one or more processors coupled to memory, one or more merchant-specific tokens that are mapped to corresponding payment card accounts and respective merchants, each of the one or more merchant-specific tokens associated with a respective status that is one of enabled or disabled;
    displaying, by the one or more processors, a graphical user interface on a customer device, wherein the graphical user interface includes a list of user interface elements each identifying a respective merchant-specific token of the one or more merchant-specific tokens, wherein each user interface element in the list comprises a selectable element that enables or disables the respective merchant-specific token;

receiving, by the one or more processors, from the customer device, a request to update user information associated with the customer device that is different from the one or more merchant-specific tokens, the request comprising updated user information;

identifying, by the one or more processors, responsive to receiving the request to update the user information, one or more merchants involved in previous payment transactions using the at least one of the one or more merchant-specific tokens;

identifying, by the one or more processors, one or more confirmed merchants from the one or more merchants that correspond to a subset of the one or more merchant-specific tokens that are enabled; and transmitting, by the one or more processors, responsive to identifying the one or more confirmed merchants, the updated user information to a computing device associated with each of the one or more confirmed merchants.

12. The method of claim 11, wherein the graphical user interface includes a merchant deletion field, and the method further comprises deleting, by the one or more processors, a selected merchant-specific token in response to receiving a deletion request from the graphical user interface caused by selection of the merchant deletion field.

13. The method of claim 12, wherein the merchant deletion field is separate from the selectable element.

14. The method of claim 12, wherein the merchant deletion field is displayed as part of the list of user interface elements.

15. The method of claim 11, further comprising assigning, by the one or more processors, the status of disabled to a selected merchant-specific token in response to a user input without deleting the selected merchant-specific token and without removing a corresponding user interface element from the list.

16. The method of claim 15, further comprising preventing, by the one or more processors, a transaction using the selected merchant-specific token responsive to assigning the status of disabled to the selected merchant-specific token.

17. The method of claim 11, further comprising sorting, by the one or more processors, the list of user interface elements in response to receiving a sort request from the graphical user interface.

18. The method of claim 17, wherein sorting the list of user interface elements is based on a merchant classification code associated with each respective merchant-specific token.

19. The method of claim 17, wherein sorting the list of user interface elements is based on a most recent transaction date associated with each respective merchant-specific token.

20. The method of claim 17, wherein sorting the list of user interface elements is based on a transaction amount associated with each respective merchant-specific token.

* * * * *